United States Patent
Takahashi

(10) Patent No.: US 8,069,943 B2
(45) Date of Patent: Dec. 6, 2011

(54) VEHICLE POP-UP HOOD APPARATUS

(75) Inventor: Hiroyuki Takahashi, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 255 days.

(21) Appl. No.: 12/004,046

(22) Filed: Dec. 20, 2007

(65) Prior Publication Data

US 2008/0156556 A1 Jul. 3, 2008

(30) Foreign Application Priority Data

Dec. 28, 2006 (JP) ................................. 2006-355117

(51) Int. Cl.
*B60R 21/38* (2011.01)

(52) U.S. Cl. ................. 180/274; 180/69.21; 296/187.04

(58) Field of Classification Search .................. 180/274, 180/69.21; 296/187.04; *B60R 21/34, 21/38*
See application file for complete search history.

(56) References Cited

U.S. PATENT DOCUMENTS

| | | | | |
|---|---|---|---|---|
| 6,554,093 | B2 * | 4/2003 | Sasaki et al. | 180/274 |
| 2005/0257980 | A1 * | 11/2005 | Green et al. | 180/274 |
| 2007/0074919 | A1 * | 4/2007 | Hirata | 180/69.2 |
| 2007/0187993 | A1 * | 8/2007 | Kalargeros | 296/193.11 |

FOREIGN PATENT DOCUMENTS

| | | | |
|---|---|---|---|
| EP | 1 564 089 A2 | | 8/2005 |
| GB | 2400826 | * | 10/2004 |
| JP | 08099652 A | * | 4/1996 |
| JP | A-2002-370611 | | 12/2002 |
| JP | B2-3377763 | | 12/2002 |
| JP | A-2004-352126 | | 12/2004 |
| JP | A-2005-59799 | | 3/2005 |
| JP | A-2006-282105 | | 10/2006 |
| JP | A-2007-062490 | | 3/2007 |
| WO | WO 01/23226 A1 | | 4/2001 |
| WO | WO 03/086826 A1 | | 10/2003 |

OTHER PUBLICATIONS

French Search Report issued on Oct. 8, 2010 in French Registration No. 0709156 (with translation).

* cited by examiner

*Primary Examiner* — Ruth Ilan
*Assistant Examiner* — Keith Frisby
(74) *Attorney, Agent, or Firm* — Oliff & Berridge, PLC

(57) ABSTRACT

A vehicle pop-up hood apparatus of the invention includes: an arm member whose proximal end portion is connected to a vehicle body so as to be pivotable about a first axis extending in the vehicle width direction; and a connection mechanism by which a hood of the vehicle is integrally connected to a tip side portion of the arm member. The hood is allowed to pivot relative to the arm member about a second axis extending in the vehicle width direction, and to move relative to the arm member in the vehicle longitudinal direction when the integrative connection, established by the connection mechanism, between the arm member and the hood is broken. The apparatus further includes an actuator that breaks the integrative connection, established by the connection mechanism, between the hood and the arm member, and that generates a lifting force that lifts the hood relative to the body.

18 Claims, 21 Drawing Sheets

VEHICLE POP-UP HOOD APPARATUS

INCORPORATION BY REFERENCE

The disclosure of Japanese Patent Application No. 2006-355117 filed on Dec. 28, 2007 including the specification, drawings and abstract is incorporated herein by reference in its entirety.

BACKGROUND OF THE INVENTION

1. Field of the Invention

The invention relates to a vehicle pop-up hood apparatus that lifts an engine hood under predetermined conditions.

2. Description of the Related Art

In a vehicle pop-up hood apparatus in which a hinge arrangement disclosed in WO01/23226A1 is used, a bonnet (engine hood) is connected to a body through a hinge mechanism. In the hinge mechanism, one end of a middle leaf (link member) is connected to a body-side lower leaf so as to be pivotable about a first pivot, and the other end of the middle leaf is connected to a bonnet-side upper leaf so as to be pivotable about a second pivot. The upper leaf and the middle leaf are integrally connected to each other through a clip mechanism. Under normal conditions, the middle leaf pivots about the first pivot when the bonnet is opened or closed.

When an air bag disposed further forward than the link mechanism and below the bonnet is activated, an air bag deploys, and the bonnet receives the lifting force from the bag, the connection between the upper leaf and the middle leaf by means of the clip mechanism is broken, and the bonnet ascends in a manner such that the bonnet pivots about a front end latch.

When the bonnet is opened under normal conditions, a locking means, such as a latch, for securely coupling the bonnet and the vehicle body on the front-end side of the bonnet is released, and the bonnet its caused to pivot about an axis on the rear-end side thereof by lifting the front-end side of the bonnet. Accordingly, the center of pivotal movement of the bonnet in this case is the first pivot that connects the lower leaf and the middle leaf. On the other hand, when the deploying air bag lifts the bonnet, the secure coupling between the bonnet and the vehicle body by means of the locking means is not released. Thus, the center of pivotal movement of the bonnet in this case is on the front-end side of the bonnet.

As described above, depending on whether the bonnet is opened under normal conditions, or is lifted by the deploying air bag, the center of the pivotal movement of the bonnet varies, and naturally, the trajectory of the pivotal movement of the bonnet varies. When the air bag lifts the bonnet, the bonnet can be drawn toward the rear of the vehicle, and the above locking means can be therefore deformed, due to the difference in the trajectory of the pivotal movement. When the resistance to deformation is high on the front-end side of the bonnet, including the locking means, and the bonnet does not move toward the rear, the first pivot and the second pivot are drawn toward the front of the vehicle, and therefore, the bonnet cannot be sufficiently lifted.

SUMMARY OF THE INVENTION

The present invention provides a vehicle pop-up hood apparatus that sufficiently lifts a hood without unnecessarily deforming a hood and various members provided near the hood.

A vehicle pop-up hood apparatus according to a first aspect of the invention includes: an arm member, of which a proximal end portion is connected to a body of a vehicle so as to be pivotable about a first axis extending in the width direction of the vehicle; and a connection mechanism by which a hood of the vehicle is integrally connected to a tip side portion of the arm member, and that allows the hood to pivot relative to the arm member about a second axis extending in the width direction of the vehicle, and to move relative to the arm member in the longitudinal direction of the vehicle when the integrative connection between the arm member and the hood is broken. The pop-up hood apparatus further includes an actuator that breaks the integrative connection, by means of the connection mechanism, between the hood and the arm member, and that generates a lifting force that lifts the hood relative to the body.

In the vehicle pop-up hood apparatus according to the first aspect of the invention, the hood is integrally connected to the tip side portion of the arm member, and the hood is connected to the body of the vehicle through the arm member. Thus, under normal conditions, the hood is pivoted about the connection portion between the arm member and the body (first axis) to open or close the hood. The term "integrative connection" means that the hood and the arm member are connected to each other so that the relative movement therebetween is prevented. The hood and the arm member may be directly connected to each other. Alternatively, the hood may be indirectly connected to the arm member through another part that is integrally connected to the hood, so that the hood, another part, and the arm member are integrally connected together.

When the actuator is activated, a lifting force is applied to the hood. When the lifting force is applied to the hood, the integrative connection between the arm member and the hood is broken. In this state, the pivotal movement of the hood relative to the arm member about the second axis extending in the width direction of the vehicle is allowed. Thus, the hood to which the lifting force from the actuator is applied ascends while pivoting relative to the arm member and pivoting about the coupling portion at which the body and the hood are coupled. The lifting force may be directly applied to the hood by the actuator, or indirectly applied to the hood through another part, for example.

When the integrative connection by means of the connection mechanism is broken, the hood is allowed to move relative to the arm member in the longitudinal direction of the vehicle. Thus, when the hood ascends while pivoting, and the hood is drawn by the coupling portion, separate from the connection mechanism, at which the hood and the body are coupled, the hood correspondingly moves relative to the arm member in the longitudinal direction of the vehicle. Thus, the hood is smoothly and sufficiently lifted without deforming the coupling portion, separate from the connection mechanism, at which the hood and the body are coupled.

In addition, in the vehicle pop-up hood apparatus of the first aspect of the invention, the lifting force from the actuator that is applied to the hood is applied in the direction such that the connection between the arm member and the hood by means of the connection mechanism is broken. Thus, the connection between the arm member and the hood by means of the connection mechanism is broken without applying an excessive load to the hood. Therefore, even when the hood is not specially reinforced, the hood is lifted without the deformation of the hood caused by the applied lifting force.

The connection mechanism may include: a slot, of which a longitudinal axis extends in the longitudinal direction of the vehicle, the slot being formed in one of the hood and the arm member; and a connection member that is provided on the other of the hood and the arm member, and is inserted in the slot so that the connection member is movable in the slot in the longitudinal direction of the slot and is rotatable relative to the one of the hood and the arm member about the second axis extending in the width direction of the vehicle.

In this configuration, inserted in the slot formed in one of the hood and the arm member is the connection member provided on the other of the hood and the arm member. When the lifting force from the actuator is directly or indirectly applied to the hood, and the integrative connection between the hood and the arm member by means of the connection mechanism is broken, the lifting force applied to the hood causes the connection member to rotate about the second axis extending in the width direction of the vehicle in the slot, so that the hood ascends while pivoting about the connection member.

In addition, when, as the hood ascends, the hood is drawn by the coupling portion, separate from the connection mechanism, at which the hood and the body are coupled, the connection member correspondingly moves in the slot in the longitudinal direction of the vehicle, so that the hood moves relative to the arm member in the longitudinal direction of the vehicle. Specifically, because, when the hood ascends while pivoting about the connection member that is inserted in the slot, the connection member moves in the slot in the longitudinal direction of the vehicle, the hood is smoothly and sufficiently lifted without deforming the coupling portion, separate from the connection mechanism, at which the hood and the body are coupled.

The slot may be set so that: when the actuator breaks the connection, established by means of the connection mechanism, between the arm member and the hood, and lifting of the hood caused by the lifting force generated by the actuator is completed, the slot is positioned on an imaginary straight line, and the longitudinal axis of the slot and the imaginary straight line substantially coincides with each other, the imaginary straight line connecting the first center of pivotal movement of the arm member relative to the body and the second center, in the connection mechanism, of pivotal movement of the arm member relative to the hood; and the length of the slot in the longitudinal direction of the slot is set equal to or greater than the sum of the diameter of the connection member and the amount of displacement between a position that the second center would take when an upward pivotal movement of the arm member relative to the body about the first center were completed with the integrative connection between the hood and the arm member by means of the connection mechanism maintained, and a position that the second center takes when an ascent of the hood caused by the lifting force generated by the actuator is completed.

The slot in which the connection member is inserted is positioned on the imaginary straight line that passes through the center of pivotal movement of the arm member relative to the body and the center of pivotal movement of the arm member relative to the hood about the second axis when the ascent of the hood caused when the lifting force from the actuator is directly or indirectly applied to the hood is completed. In addition, the shape of the slot is set so that the longitudinal axis of the slot lies along the imaginary straight line.

In addition, the longitudinal dimension of the slot is set greater than the sum of the diameter of the connection member and the amount of displacement between the position that the center of pivotal movement of the arm member relative to the hood about the second axis would take when the arm member pivoted upward about the center of the pivotal movement of the arm member relative to the body with the integrative connection between the hood and the arm member by means of the connection mechanism maintained and the upward pivotal movement were completed, and the position that the center of pivotal movement of the arm member relative to the hood about the second axis when the hood is lifted by the lifting force.

When the position, the longitudinal direction, and the longitudinal dimension of the slot are set in this way, it is possible to obtain a minimally sized slot. As a result, the size of the member in which the slot is formed is reduced, and the size of the vehicle pop-up hood apparatus is therefore reduced.

The actuator may be fixed to the hood and apply the lifting force to at least one of the body and the arm member.

When the actuator is fixed to the hood, the force from the actuator is applied to the body or the arm member, and the reaction force thereto becomes the lifting force that lifts the hood. The lifting force breaks the integrative connection between the hood and the arm member by means of the connection mechanism, and the hood is lifted by the applied lifting force. At the same time, the hood is allowed to pivot relative to the arm member about the second axis extending in the width direction of the vehicle, and to move relative to the arm member in the longitudinal direction of the vehicle.

As described above, in this vehicle pop-up hood apparatus, the actuator is fixed to the hood, and it is therefore unnecessary to secure the space for disposing the actuator on the body side. In other words, even when there is no space for disposing the actuator on the body side, it is possible to mount the vehicle pop-up hood apparatus according to the invention on a vehicle.

The connection mechanism may include: a first connection section that connects the hood of the vehicle to the tip side portion of the arm member so that the hood can pivot relative to the arm member about the second axis extending in the width direction of the vehicle and can move relative to the arm member in the longitudinal direction of the vehicle; and a second connection section that connects the hood to the arm member so that pivotal movement of the hood relative to the arm member about the first connection section and movement of the hood relative to the arm member in the longitudinal direction of the vehicle are made impossible. The connection by means of the second connection section is broken by the actuator.

The hood is connected to the body of the vehicle through the arm member. The arm member is connected to the hood by means of the first connection section so that the arm member can pivot about the second axis extending in the width direction of the vehicle, and can move relative to the hood in the longitudinal direction of the vehicle. However, the second connection section connects the arm member to the hood so that neither the pivotal movement of the hood relative to the arm member about the second axis, nor the movement of the hood relative to the arm member in the longitudinal direction of the vehicle are possible, and therefore, under normal conditions, the hood is pivoted about the connection portion at which the arm member and the hood are directly or indirectly connected to each other, whereby the hood is opened or closed.

On the other hand, when the lifting force from the actuator is directly or indirectly applied to the hood, the connection between the arm member and the hood by means of the second connection section is broken by the lifting force. Thus, the hood ascends while pivoting about the first connection section between the arm member and the hood, and causing the arm member to pivot about the connection portion at which the arm member and the body are directly or indirectly connected to each other. In addition, when the hood ascends while pivoting, and the hood is drawn by the coupling portion, separate from the connection mechanism, at which the hood and the body are coupled, the hood moves relative to the arm member in the longitudinal direction of the vehicle by virtue of the first connection section. Specifically, when the connection at the second connection section, which is a component of the connection mechanism, is broken by the lifting force, the hood is smoothly and sufficiently lifted without deforming the coupling portion, separate from the connection mechanism, at which the hood and the body are coupled.

The actuator may apply the lifting force along a line passing through a point between the first connection section and the second connection section.

The lifting force from the actuator is applied along a line passing through a point between the first connection section (more specifically, the center of pivotal movement of the hood relative to the arm member at the first connection section), and the second connection section (more specifically, the connection between the arm member and the hood by means of the second connection section). In particular, when the lifting force from the actuator is directly applied to the hood, the lifting force may be applied along a line passing through a point between the first connection section and the second connection section.

In the case where the lifting force from the actuator is directly applied to the hood, when the hood is urged to ascend by the lifting force applied to the hood, the hood is urged to pivot relative to the arm member about the connection portion (the first connection section) at which the hood and the arm member are connected to each other. The turning force caused by the relative pivotal movement breaks the connection between the hood and the arm member by means of the second connection section. In order to break the connection, by means of the second connection section, between the hood and the arm member with the use of the turning force caused by the relative pivotal movement, the lifting force that lifts the hood may be applied on the second connection section side with respect to the connection portion (the first connection section) between the hood and the arm member.

On the other hand, the position of the center about which the hood is pivoted relative to the body of the vehicle by the lifting force from the actuator is at the coupling portion (lock portion) at which the hood and the body are coupled, the coupling portion being located on the side opposite to the second connection section with respect to the first connection portion (the first connection section) at which the hood and the arm member are connected to each other. Thus, when the angle at which the hood pivots upward about the coupling portion (lock portion) between the hood and the body is the same, the closer a position is to the coupling portion between the hood and the body, the less the amount of lifting with respect to the body is at the position.

When the lifting force from the actuator is directly applied to the hood, it is possible to reduce the amount of lifting, with respect to the body, of the hood at the point at which the lifting force is applied while maintaining the direction of the pivotal movement of the hood relative to the arm member about the first connection portion (first connection section) between the hood and the arm member in the direction such that the connection between the hood and the arm member by means of the second connection section is broken. Thus, it is possible to reduce the amount of lifting of the hood by which the actuator has to lift the hood to accomplish the lifting operation. Accordingly, for example, it is possible to reduce the actuation stroke of the actuator required to accomplish the lifting of the hood, and it is therefore possible to use a compact actuator.

The actuator may apply the lifting force to the arm member on a side opposite to the second connection section with respect to the first connection section to indirectly apply the lifting force to the hood through the arm member.

In this case, the lifting force from the actuator is applied to the arm member on the side opposite to the second connection section with respect to the first connection section. When the lifting force from the actuator is applied to the arm member, the arm member is urged to pivot about the connection portion (first connection section) between the arm member and the hood, and the connection between the arm member and the hood by means of the second connection section is broken by the turning force about the first connection portion. When the connection between the arm member and the hood by means of the second connection section is broken in this way, the arm member ascends while pivoting about the connection portion (first connection section) between the arm member and the hood, and pivoting about the connection portion at which the arm member and the body are directly or indirectly connected. Thus, the hood ascends.

As described above, because the lifting force from the actuator is applied on the side opposite to the second connection section with respect to the first connection section, it is possible to dispose the actuator even when the configuration of the body or the hood is such that the actuator cannot be disposed on the second connection section side with respect to the first connection section.

At least one of the body and the hood may include a bracket, the arm member may be connected to the bracket, and the actuator may be fixed to the bracket.

In this case, the body or the hood includes a bracket that is integrally fixed to the body or the hood. When the bracket is fixed to the body, the proximal end portion of the arm member is pivotally connected to the bracket about the first axis extending in the width direction of the vehicle, for example. When the bracket is fixed to the hood, the arm member is pivotally connected to the bracket about the second axis extending in the width direction of the vehicle by means of the second connection section, for example. In summary, the arm member is connected to the body or the hood through the bracket.

The actuator may also be fixed to the bracket. In this case, it is possible to assemble the arm member and the actuator in advance. When the assembly, constituted of the bracket, arm member, and the actuator, is fixed to the body or hood, the arm member is connected to the body or hood, and at the same time, the actuator is fixed to the body or hood. Thus, it is possible to reduce the number of steps required to fix the vehicle pop-up hood apparatus to a vehicle, and to improve the accuracy of dimensions between the body or hood, the actuator, and the arm member, and the accuracy in fixing the individual members to the body or hood.

The actuator may include: an actuator body that is provided on one of the body and the hood; and a slide member, provided so as to be linearly slidable relative to the actuator body, that slides in a direction such that a distal end of the slide member moves away from the actuator body to generate the lifting force.

When the slide member slides in the direction such that the distal end of the slide member moves away from the actuator body that is provided on one of the body and the hood, the other of the body and the hood is pushed directly or indirectly through the arm member or the like. This pushing force breaks the connection, established by means of the second connection section, between the hood and the arm member, and the hood ascends. Thus, is it possible to lift the hood by the linear sliding force from the slide member.

The actuator body may be provided on the one of the body and the hood so as to be swingable about a third axis extending in the width direction of the vehicle.

The actuator body is connected to one of the body and the hood so as to be swingable about the third axis extending in the width direction of the vehicle. Thus, when the line along which the distal end of the slide member faces the point to which the distal end applies the pushing force is inclined as the hood is lifted by the lifting force from the actuator; the actuator body swings so that the line along which the slide member slides coincides with the former line. Thus, it is possible to efficiently apply the pushing force from the slide member, which is caused when the slide member slides.

The slide member may apply the lifting force to the hood by directly applying a pushing force to one of the body, the hood, and the arm member through the distal end of the slide member, and the distal end of the slide member, and the one of the body, the hood, and the arm member are connected to each other so as to be swingable relative to each other about a fourth axis extending in the width direction of the vehicle.

The one of the body, hood, and arm member that directly receives the pushing force from the slide member, and the distal end of the slide member are swingably connected about the fourth axis extending in the width direction of the vehicle. Thus, even when the member that directly receives the pushing force from the slide member is inclined or moves in the longitudinal direction of the vehicle as the slide member slides, the slide member swings, so that the position of the connection between the slide member (the distal end thereof) and the one of the body, hood, and arm member that directly receives the pushing force from the slide member, that is, the point at which the pushing force from the slide member is applied is unchanged. Accordingly, it is possible to stably apply the pushing force from the slide member to stably lift the hood.

The distal end of the slide member with respect to a slide direction of the slide member may be contact with the other of the body and the hood when the hood is closed.

When the hood is in the closed state, more specifically, when the engine room of the body is closed with the hood, the distal end of the slide member is in contact with the other of the body and the hood in the direction in which the slide member slides. Thus, when the slide member slides, the slide member efficiently pushes the other of the body and the hood to lift the hood. In other words, it is possible to allow the force for sliding the slide member to effectively contribute to the lifting of the hood.

The pop-up hood apparatus may further include: a pushing force application portion to which a pushing force that is generated when the slide member slides is directly applied, and a rolling element, provided on one of the distal end of the slide member and the pushing force application portion, that is rotatable about a fifth axis extending in the width direction of the vehicle. The outer surface of the rolling element rollably abuts the other of the distal end of the slide member and the pushing force application portion.

In other words, the rolling element, which can rotate about the fifth axis extending in the width direction of the vehicle, is provided to one of the distal end of the slide member and the pushing force application portion to which the pushing force generated when the slide member slides is directly applied. The outer surface of the rolling element abuts the other of the distal end of the slide member and the pushing force application portion. The portion, on which the outer surface of the rolling element abuts, of the other of the distal end of the slide member and the pushing force application portion, is referred to as a rolling element contact portion.

When the pushing force from the slide member is applied to the pushing force application portion to lift the hood, and the pushing force application portion and the actuator move relative to each other in the longitudinal direction of the vehicle, the movement causes the rolling element to roll with the outer surface of the rolling element in contact with the rolling element contact portion. In this way, the rolling element moves according to the relative movement between the pushing force application portion and the actuator in the longitudinal direction of the vehicle. Thus, when the actuator moves relative to the pushing force application portion in the longitudinal direction of the vehicle, the rolling element rolls, and smooth movement is thus achieved. As a result, it is possible to more effectively prevent the coupling portion, separate from the arm member, between the hood and the body from being deformed as the hood ascends, and therefore, the hood is surely lied.

The slide member may slide in a predetermined direction that crosses the vertical direction of the vehicle, and the pop-up hood apparatus may further include a conversion portion that changes a direction of the force in the predetermined direction that is generated when the slide member slides, thereby converting the force to the lifting force.

When the slide member of the actuator slides, a linearly directed force applied in the direction in which the slide member slides is generated. When the sliding direction of the slide member is inclined and coincides with the predetermined direction that crosses the vertical direction of the vehicle, the direction in which the linearly directed force generated when the slide member slides also coincides with the predetermined direction. The direction of the thus generated force directed in the predetermined direction is changed by the conversion portion, and the above force is thus converted to the lifting force that lifts the hood.

Thus, there is no need to set the sliding direction of the slide member in the direction, such as the vertical direction of the vehicle, that is optimum to lift the hood. Accordingly, when the actuator is directly or indirectly fixed to the body or the hood, it is possible to fix the actuator in the optimum position, for example.

The connection mechanism may include a deformation portion by which the arm member and the hood are integrally connected with each other, and that breaks the integrative connection between the arm member and the hood by being plastically deformed by the lifting force generated by the actuator.

In this case, the arm member and the hood are integrally connected to each other using the deformation portion, which is a component of the connection mechanism. When the lifting force from the actuator is applied to the hood, the arm member, or the body, the deformation portion is plastically deformed by the lifting force. When this occurs, if the connection mechanism includes the deformation portion, and the first connection section that connects the hood and the arm member so that the hood and the arm member can pivot relative to each other, the plastic deformation of the deformation portion breaks the connection between the arm member and the hood, and the hood ascends while pivoting about the connection portion (first connection section) between the arm member and the hood, and causing the arm member to pivot about the connection portion at which the arm member and the body are directly or indirectly connected to each other.

Thus, in order to break the connection between the hood and the arm member, all that has to be done is to plastically deform the deformation portion. Thus, it is possible to simplify the construction of the connection mechanism by which the hood and the arm member are connected. In other words, it is possible to simplify the construction of the portion of the connection mechanism, which portion is used to integrally connect the arm member and the hood.

The pop-up hood apparatus may further include: a first restriction mechanism that restricts the angle of pivotal movement of the arm member relative to the body to a predetermined angle at a connection portion at which the proximal end portion of the arm member and the body are connected; and a second restriction mechanism that, when the hood is lifted by the lifting force, stops the ascent of the hood before pivotal movement of the arm member relative to the body is stopped by the first restriction mechanism.

When the hood is lifted with the hood and the arm member integrally connected to each other by means of the connection mechanism, the hood pivots with the arm member about the connection portion between the proximal end portion of the arm member and the body. In this way, the engine room of the body, closed with the hood, is opened. When the hood pivots along with the arm member by a predetermined angle, the pivotal movement of the arm member is stopped by the first restriction mechanism, which restricts the angle of pivotal movement of the hood to a predetermined angle under normal conditions, and pivotal movement of the hood is therefore stopped. Thus, the hood is not pivoted beyond a predetermined range.

On the other hand, when the actuator is activated and the hood is urged to ascend by the lifting force from the actuator, the integrative connection between the arm member and the hood by means of the connection mechanism is broken, and the hood ascends. When the hood ascends in this way, the hood pivots about the first connection section of the connection mechanism between the arm member and the hood, and the arm member pivots about the connection portion at which the proximal end portion of the arm member and the body are directly or indirectly connected to each other. Before the pivotal movement of the arm member is stopped by the first restriction mechanism, the ascent of the hood is stopped by the second restriction mechanism. Thus, the load generated by the turning force applied to the arm member when the hood is lifted by the lifting force from the actuator is not applied to the first restriction mechanism.

Thus, there is no need to give the first restriction mechanism the mechanical strength enough to withstand the load that is generated by the turning force applied to the arm member when the hood is lifted by the lifting force from the actuator. Accordingly, it is possible to achieve size reduction and simplification of the first restriction mechanism. In addition, because the ascent of the hood is restricted by the second restriction mechanism, it is possible to prevent the situation that the hood is separated from the actuator and the hood is thus vertically vibrated (oscillated) due to the impulsive force exerted when the hood ascends.

The second restriction mechanism may include a contact portion that is integrally formed with the arm member, and that, when the hood is pivoted relative to the arm member about the second axis by the lifting force, is brought into planar contact with the hood to stop the pivotal movement of the hood relative to the arm member, whereby the ascent of the hood is stopped. The hood may be construed as including a predetermined member that is integrally provided on the hood, that is, fixed to the hood.

When the connection between the arm member arm the hood by means of the second restriction mechanism is broken and the hood ascends by a predetermined amount while pivoting about the connection portion (first connection section) between the arm member and the hood by virtue of the lifting force from the actuator, for example, the contact portion of the second restriction mechanism is brought into planar contact with the hood, or the predetermined member that is integrally provided on the hood. Thus, further pivotal movement of the hood is stopped, and thus, the ascent of the hood is stopped.

Because the contact portion restricts the ascent of the hood by being brought into planar contact with the hood, or the predetermined member that is integrally provided on the hood, the force that the contact portion receives from the hood, or the predetermined member that is integrally provided with the foord, when the contact portion stops the ascent of the hood is distributed. By making large the area of contact between the contact portion and the hood or the predetermined member that is integrally provided on the hood, the mechanical strength of the contact portion (second restriction mechanism), which is required to withstand the force applied from the hood or the predetermined member that is integrally provided on the hood, is easily improved.

The first restriction mechanism may include: an obstruction portion provided at or near the second connection portion between the proximal end portion of the arm member and the body; and an obstructed portion that is integrally formed with the arm member, and that, when the arm member pivots relative to the body as the hood pivots in a direction such that the hood is opened, comes close to the obstruction portion, and is brought into contact with the obstruction portion to stop the pivotal movement of the arm member relative to the body is stopped. The hood may be construed as including a predetermined member that is integrally provided on the hood, that is, fixed to the hood.

When the arm member pivots about the connection portion between the proximal end portion of the arm member and the body, the obstructed portion provided on the arm member comes close to the obstruction portion provided on the body or a predetermined member fixed to the body. When the arm member pivots by a predetermined angle, the obstructed portion is brought into contact with the obstruction portion, so that the obstruction portion interferes with the obstructed portion. Thus, pivotal movement of the obstructed portion, and therefore, pivotal movement of the arm member is restricted.

When the second restriction mechanism is provided, there is no need to give the obstruction portion and the obstructed portion the mechanical strength enough to withstand the load generated by the turning force applied to the arm member when the hood is lifted by the lifting force from the actuator. Thus, the construction of the obstruction portion and the obstructed portion is simplified, that is, for example, the obstruction portion and the obstructed portion, which constitute the first restriction mechanism, may be small tabs or small projections.

The pop-up hood apparatus may further include a third restriction mechanism that restricts pivotal movement in a direction opposite to the direction of the pivotal movement, caused by the lifting force, of the arm member relative to the hood about the second axis.

When the arm member is urged to pivot relative to the hood in the direction opposite to the direction in which the arm member is pivoted relative to the hood about the second axis by the lifting force from the actuator, the pivotal movement is stopped by the third restriction mechanism. Thus, even when a force that causes such pivotal movement occurs, pivotal movement of the arm member relative to the hood does not occur, and the integrative connection between the hood and the arm member by means of the connection mechanism is not broken.

Thus, there is no need to consider the turning force of which the direction is opposite to the direction of pivotal movement caused by the lifting force from the actuator when the turning force required to break the connection between the hood and the arm member by means of the connection mechanism is determined. In principle, the apparatus may be designed so that the connection between the hood and the arm member by means of the connection mechanism is broken by the turning force generated by the lifting force from the actuator. Thus, the strength of the connection provided by the connection mechanism at which the hood and the arm member are integrally connected to each other can be set at a low value (to the extent that the integrative connection between the hood and the arm member by means of the connection mechanism is broken by the turning force generated by the lifting force from the actuator).

Assuming that the direction in which the hood is pivoted when the hood is lifted to open the engine room under normal conditions is opposite to the direction in which the arm member is pivoted relative to the hood about the second axis by the lifting force from the actuator, for example, when the hood and the arm member are pivoted (lifted) to the fully open position where pivotal movement of the arm member is stopped, and a turning force that causes the hood and the arm member to pivot beyond the fully open position is further applied to the hood, excessive opening can occur, which means that the hood pivots relative to the arm member of which pivotal movement is stopped, which can break the connection between the hood and the arm member by means of the second connection section.

However, when the connection mechanism is constituted of the first and second connection sections in this way, for example, pivotal movement of the hood relative to the arm member in the direction opposite to the direction in which the arm member is pivoted relative to the hood about the second axis by the lifting force from the actuator is stopped, and the excessive opening of the hood, that is, pivotal movement beyond the fully open position, is stopped by the third restriction mechanism. Thus, it is possible to prevent the integrative connection between the hood and the arm member by means of the second connection section from being broken due to the excessive opening.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
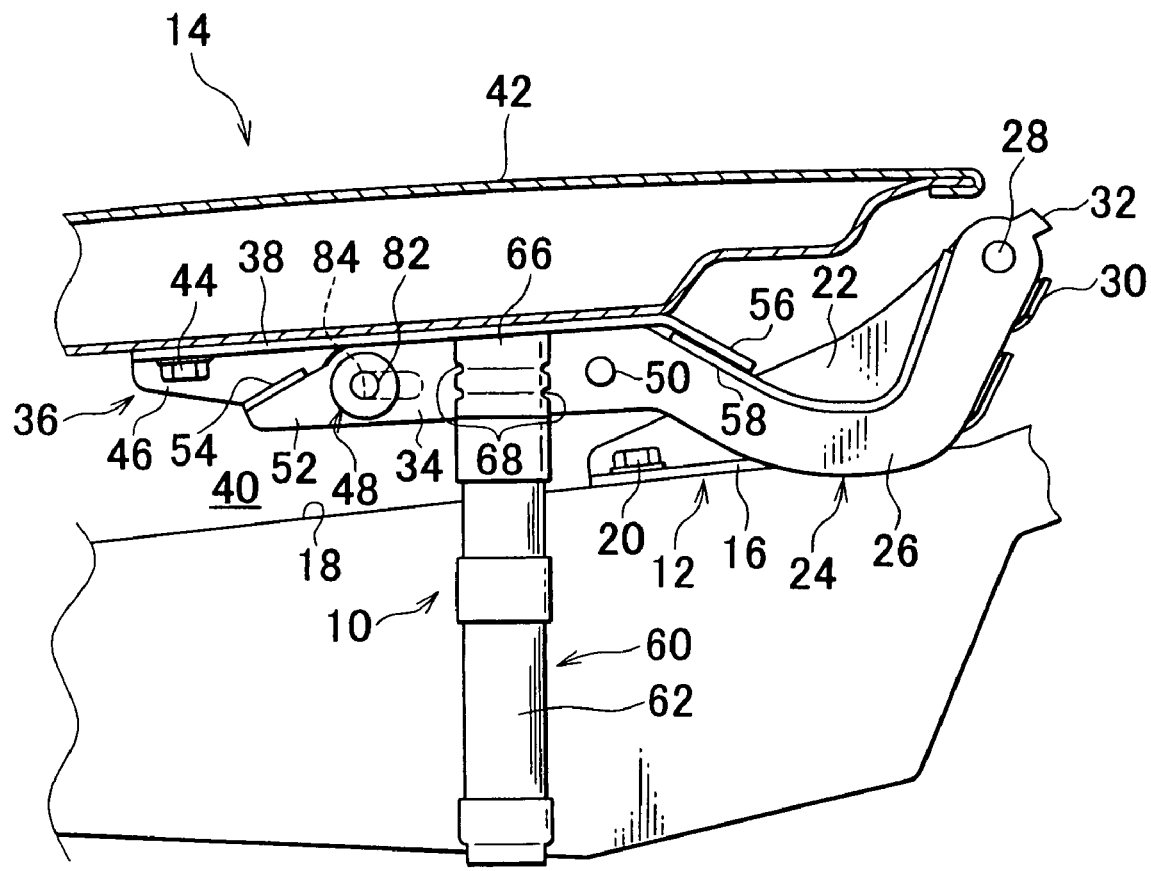
FIG. 1 is a side view showing a configuration of a main portion of a vehicle in which a vehicle pop-up hood apparatus according to a first embodiment of the invention is used.
Figure 2:
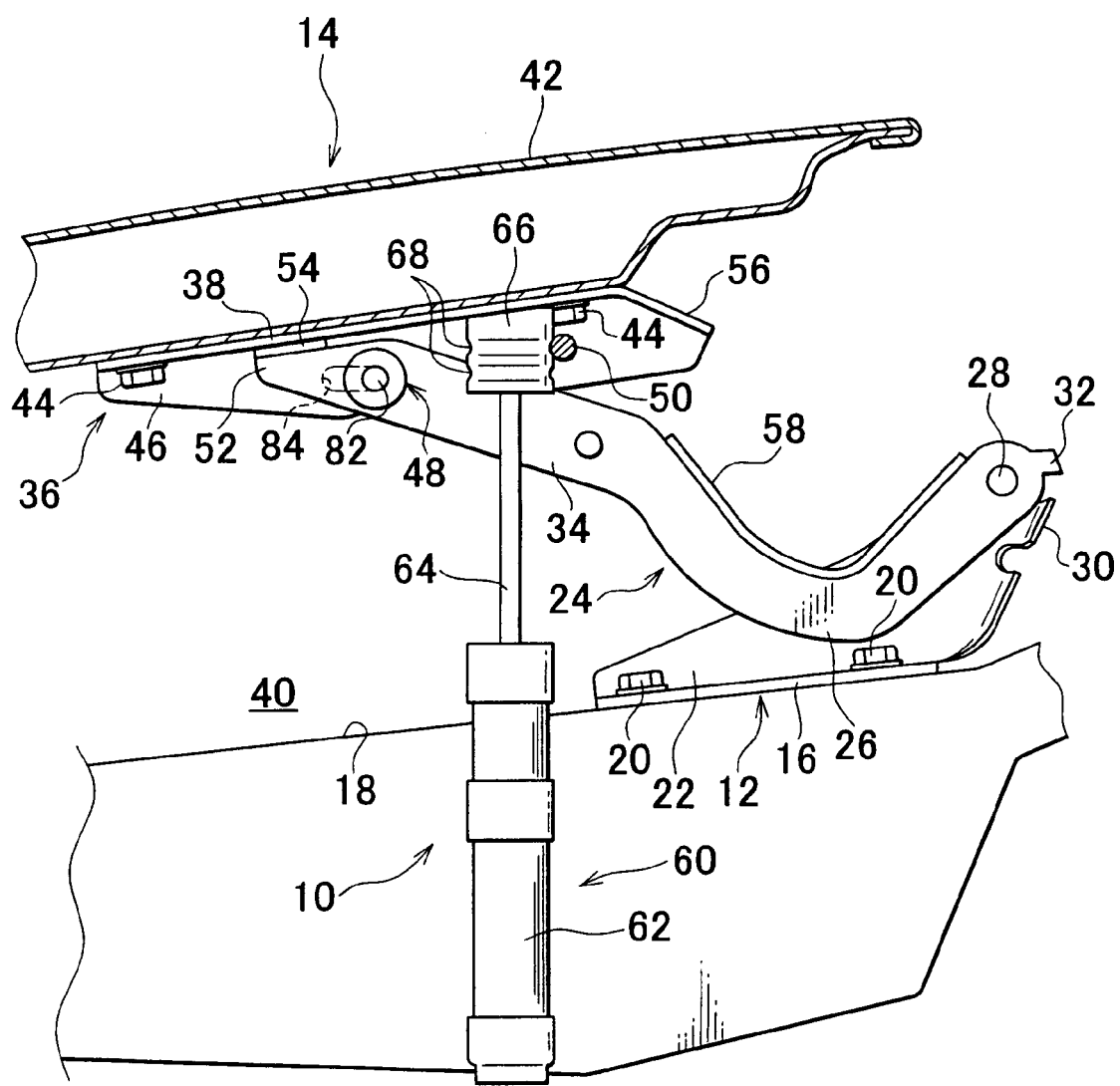
FIG. 2 is a side view corresponding to FIG. 1, showing a state in which the vehicle pop-up hood apparatus according to the first embodiment of the invention is activated.

FIG. 1 shows a configuration of a pop-up hood apparatus 10 for a vehicle according to a first embodiment of the invention in side view. FIG. 2 shows a side view corresponding to FIG. 1, in which the vehicle pop-up hood apparatus 10 is activated.

As shown in FIGS. 1 and 2, the vehicle pop-up hood apparatus 10 includes a hinge base 12 provided at each of lateral end portions of the vehicle 14. The hinge base 12 is formed of a plate thicker than a panel for forming a cowl top 18, which is a component of a body of the vehicle 14, and a hood 42. The hinge base 12 includes a flat base portion 16 of which the thickness direction is made to substantially coincide with the vertical direction of the vehicle 14. The base portion 16 is disposed on the cowl top 18 and is integrally fixed to the cowl top 18 with fastening means, such as bolts 20.

The hinge base 12 is basically a component of the vehicle pop-up hood apparatus 10. However, because the base portion 16 is integrally fixed to the cowl top 18 with the bolts 20, the hinge base 12 may be regarded as part of the body of the vehicle 14. From one end of the base portion 16 in the lateral direction of the vehicle 14, a supporting portion 22 is extended in a thickness direction of the base portion 16, that is, upward with respect to the vehicle 14. The supporting portion 22 has a shape of a plate of which the thickness direction is made to coincide with the lateral direction of the vehicle 14. An arm member 24 is disposed on one side of the supporting portion 22 in the thickness direction of the supporting portion 22.

The arm member 24 is formed of a plate thicker than a panel for forming the cowl top 18 and the hood 42. The arm member 24 includes an arm body 26. The thickness direction of the arm body 26 coincides with the thickness direction of the supporting portion 22, and the arm body 26 is formed to have a shape of a plate of which the thickness direction coincides with the thickness direction of the supporting portion 22, and which is bent or curved so as to be substantially V-shaped or U-shaped around the axis extending in the thickness direction of the arm body 26. A connecting shaft 28 is provided at one end (rear end) of the arm body 26.

The connecting shaft 28 is a shaft member of which the axis extends in the thickness direction of the supporting portion 22 and the arm body 26. The connecting shaft 28 connects the arm body 26 with the supporting portion 22 in a state where the connecting shaft 28 penetrates both the arm body 26 and the supporting portion 22, and at the same time, the connecting shaft 28 supports the arm body 26 so that the arm body 26 can pivot about the connecting shaft 28. A stopper 30, which serves as the obstruction portion of the first restriction mechanism, is provided on the connecting shaft 28-side of the supporting portion 22. The stopper 30 extends from a peripheral portion of the supporting portion 22 on the arm body 26-side, and the tip of the stopper 30 is positioned beside a peripheral portion of the arm body 26.

Figure 3:
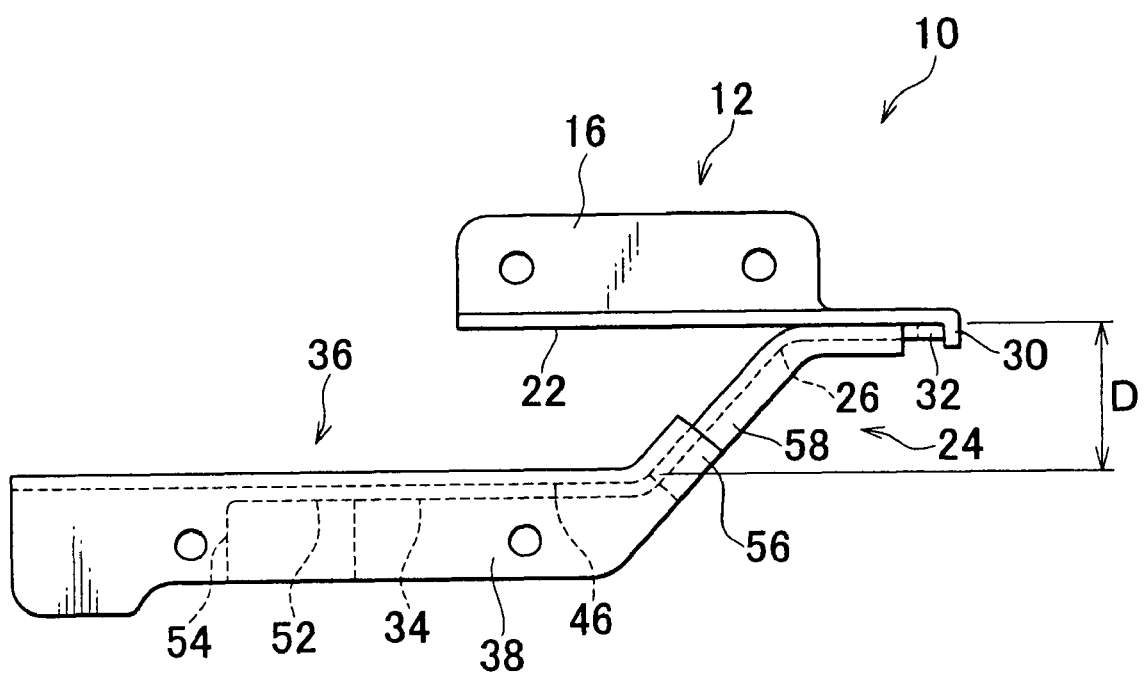
FIG. 3 is a plan view showing a configuration of a main portion of the vehicle pop-up hood apparatus according to the first embodiment of the invention.

A contact tab 32, which serves as the obstructed portion of the first restriction mechanism, protrudes from a peripheral portion of the arm body 26, corresponding to the stopper 30. When the arm body 26 pivots about the connecting shaft 28 so that the distal end side of the arm body 26 ascends, the contact tab 32 comes close to the stopper 30. When the contact tab 32 is brought into contact with the stopper 30, further pivotal movement of the arm body 26 is prevented. As shown in FIG. 3, the side (front-end side) of the arm body 26 opposite to the connecting shaft 28-side is offset in the lateral direction of the vehicle 14 by a dimension D with respect to the end portion on the connecting shaft 28-side, and a connection leaf 34 is continuously formed, toward the front of the vehicle 14, from the side of the arm body 26 opposite to the connecting shaft 28-side. The connection leaf 34 has a shape of a plate of which the thickness direction coincides with the thickness direction of the supporting portion 22.

Meanwhile, the vehicle pop-up hood apparatus 10 includes a hinge upper 36. The hinge upper 36 is formed of a plate thicker than the panel for forming the hood 42. The hinge upper 36 includes a flat base portion 38 of which the thickness direction substantially coincides with the vertical direction of the vehicle 14. The base portion 38 is disposed on the back surface of the hood 42 for closing an engine compartment 40 of the vehicle 14, and is integrally fixed to the hood 42 with fastening means, such as bolts 44.

The hinge upper 36 is basically a component of the vehicle pop-up hood apparatus 10. However, because the base portion 38 is integrally fixed to the hood 42 with the bolts 44, the hinge upper 36 may be regarded as part of the hood 42. From one end of the base portion 38 in the lateral direction of the hood 42, a connection leaf 46 is extended in a thickness direction of the base portion 38. The connection leaf 46 has a shape of a plate of which the thickness direction coincides with the lateral direction of the vehicle 14. The above-described connection leaf 34 is disposed on one side of the connection leaf 46 in the thickness direction thereof.

The connection leaves 34 and 46 are connected through a connection portion 48, which serves as the first connection section of the connection mechanism. The connection portion 48 includes a shaft 82 provided on the connection leaf 34. The shaft 82 is a shaft member of which the axis extends in the thickness direction of the connection leaf 34, protruding from the surface of the connection leaf 34 on the connection leaf 46 side thereof. A slot 84, which constitutes the connection portion 48 along with the shaft 82, is formed in the connection leaf 46, corresponding to the shaft 82. The shaft 82 is inserted in the slot 84. The inner width of the slot 84 taken along the direction perpendicular to the longitudinal direction of the slot 84 is slightly greater than the outer diameter of the shaft 82. The shaft 82 is rotatable about the axis of itself in the slot 84, and is movable in the longitudinal direction of the slot 84. In addition, in the initial condition (normal condition) where the connection leaf 34 and the connection leaf 46 are connected with each other by a shear pin 50 described later, the shaft 82 is positioned on the front-end side of the slot 84.

The shear pin 50, which serves as the deformation portion of the second connection section, and, from a different aspect, serves as the second connection section of the connection mechanism, is provided on the side, with respect to the connection portion 48, that is closer to the rear end of the hood 42. The shear pin 50 is provided so as to penetrate both the connection leaves 34 and 46, and mechanically connects the connection leaves 34 and 46. The shear pin 50 connects the connection leaves 34 and 46 at a position spaced apart from the connection portion 48, so that pivotal movement of the connection leaf 34 relative to the connection leaf 46 about the connection portion 48 is restricted. Thus, the connection leaves 34 and 46 are integrally connected.

On the other hand, an extension leaf 52 for a stopper is continuously extended from the end portion of the connection leaf 34 on the side opposite to the arm body 26. A stopper 54, which serves as the contact portion of the second restriction mechanism, is provided on the stopper extension leaf 52. The stopper 54 has a flat plate shape. When the connection leaf 34 pivots relative to the connection leaf 46 about the connection portion 48 by a predetermined angle, the thickness direction of the stopper 54 and the thickness direction of the base portion 38 substantially coincides with each other, and the stopper 54 is brought into contact with the base portion 38, so that pivotal movement of the connection leaf 34 relative to the connection leaf 46 is restricted.

Figure 5:
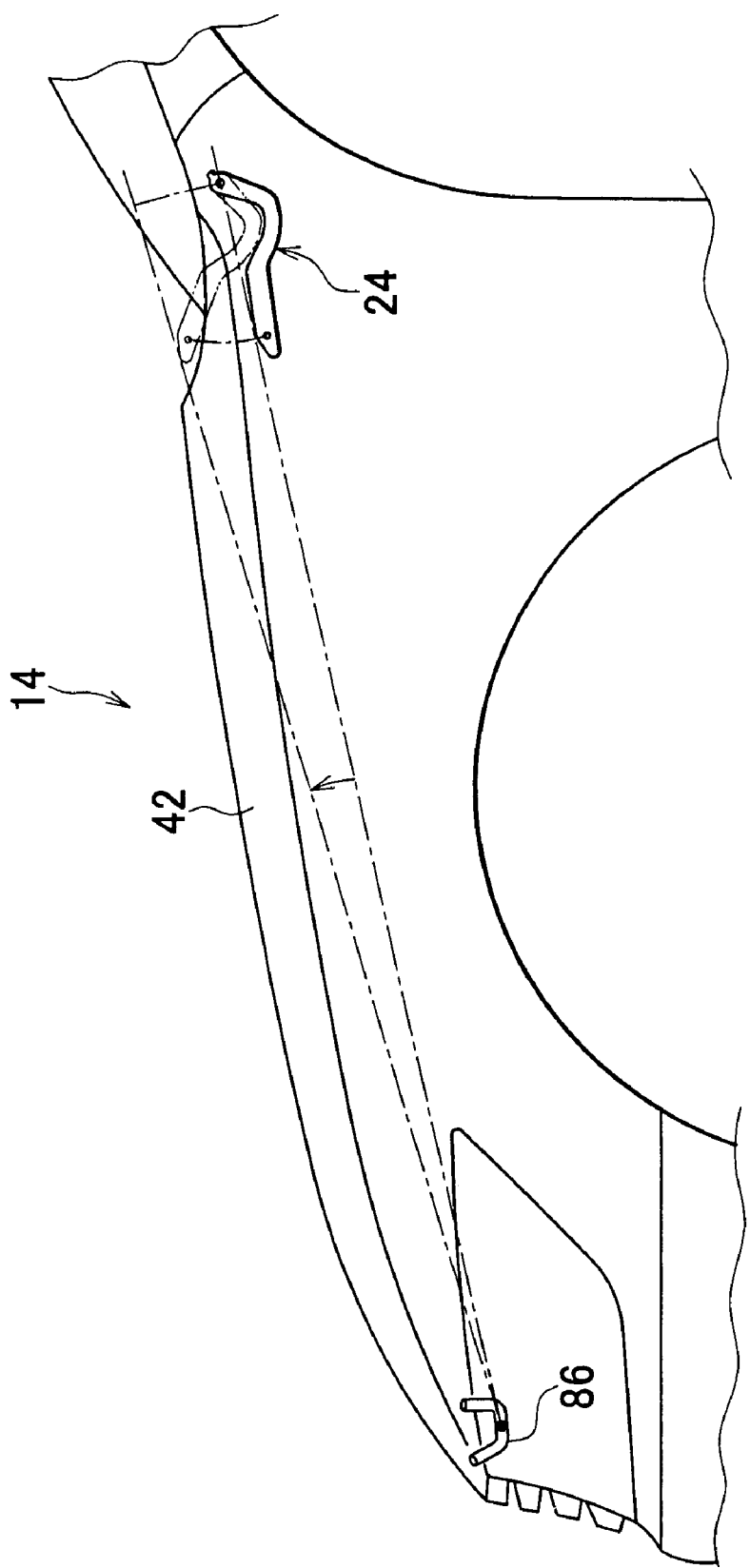
FIG. 5 is a side view showing a positional relationship between the center of pivotal movement of a hood and the center of pivotal movement of an arm member.

The above-described hood 42 is, on the front-end side thereof, mechanically coupled to the body of the vehicle 14 through a latch 86 (see FIG. 5). When the hood 42 pivots about the coupling portion between the hood 42 and the body of the vehicle 14 so that the hood 42 ascends, the hinge upper 36 fixed to the hood 42 pivots with the hood 42. The position in which the stopper 54 is provided (the inclination angle of the stopper 54 with respect to the base portion 38 when the engine compartment 40 is closed by the hood 42, for example) is set so that, when the arm member 24 pivots about the connecting shaft 28 concurrently with such pivotal movement of the hood 42, the stopper 54 is brought into contact with the base portion 38 of the hinge upper 36 before the stopper 30 is brought into contact with the contact tab 32, as shown in FIG. 2.

The above-described hinge upper 36 is provided with a contact leaf 56, which is a component of the third restriction mechanism. The contact leaf 56 has a shape of a plate, which is extended from the rear end portion of the base portion 38, that is, provided on the rear side, closer to the rear of the vehicle 14, of the base portion 38. Under the contact leaf 56, a supporting leaf 58, which constitutes the third restriction mechanism along with the contact leaf 56, is continuously extended from an upper edge portion of the arm body 26. The supporting leaf 58 faces the contact leaf 56 in the vertical direction of the vehicle 14 (more specifically, a direction inclined in the longitudinal direction of the vehicle 14 with respect to the vertical direction of the vehicle 14), and is in contact with the contact leaf 56 on the lower side of the contact leaf 56 under conditions where the connection leaves 34 and 46 are connected through the shear pin 50.

The vehicle pop-up hood apparatus 10 further includes an actuator 60. The actuator 60 includes an actuator body 62, which is integrally fixed to a side face of the cowl top 18 by means of a bracket or the like. The actuator body 62 is a bottomed cylinder of which the axis extends substantially in the vertical direction of the vehicle 14. In the actuator body 62, a gas generating propellant, which burns to instantaneously generate gas, an ignition device for igniting the gas generating propellant, etc. are contained, for example. The actuator body 62 is electrically connected to an ECU, which functions as the controller (not shown). When the ignition device receives an ignition signal output from the ECU, the ignition device ignites the gas generating propellant to burn it. When the gas generating propellant burns in this way, gas is generated in the actuator body 62, and the gas raises the internal pressure in the actuator body 62.

As shown in FIG. 2, the actuator body 62 is provided with a slide shaft 64. The slide shaft 64 is a rod-like member of which the axis lies along the axis of the actuator body 62, and a piston (not shown) is integrally fixed to the longitudinal proximal end of the slide shaft 64. The piston is slidably accommodated in the actuator body 62. When the gas generating propellant in the actuator body 62 burns to raise the internal pressure in the actuator body 62, the internal pressure causes the piston to ascend toward the upper end side of the actuator body 62, and the slide shaft 64 ascends with the piston.

A pushing portion 66 is integrally fitted onto the upper end of the slide shaft 64. The pushing portion 66 is made of a hard rubber or the like and has a cylindrical shape of which the outer diameter is greater than the outer diameter of the slide shaft 64. The pushing portion 66 is coaxially fitted onto the slide shaft 64. The top surface of the pushing portion 66 (the end surface on the side opposite to the side on which the pushing portion 66 and the slide shaft 64 are connected) is in contact with the base portion 38 on the shear pin 50-side with respect to the connection portion 48 (more specifically, between the connection portion 48 and the shear pin 50). An annular groove 68 is formed in the outer side of the pushing portion 66, and the outer diameter of the pushing portion 66 is relatively small at the portion where the groove 68 is formed. The orientation of the pushing portion 66 can be varied by elastically deforming the pushing portion 66 so as to reduce or broaden the opening width of the groove 68 in the axial direction of the pushing portion 66.

In this embodiment, the slide stroke of the piston in the actuator body 62, that is, the slide stroke of the slide shaft 64, is set to a length such that, when the pushing portion 66 pushes the base portion 38 of the hinge upper 36 upward, and the hinge upper 36 pivots relative to the arm member 24 about the connection portion 48 with the connection between the connection leaves 34 and 46 by means of the shear pin 50 broken, the stopper 54 is brought into contact with the base portion 38.

Figure 4:
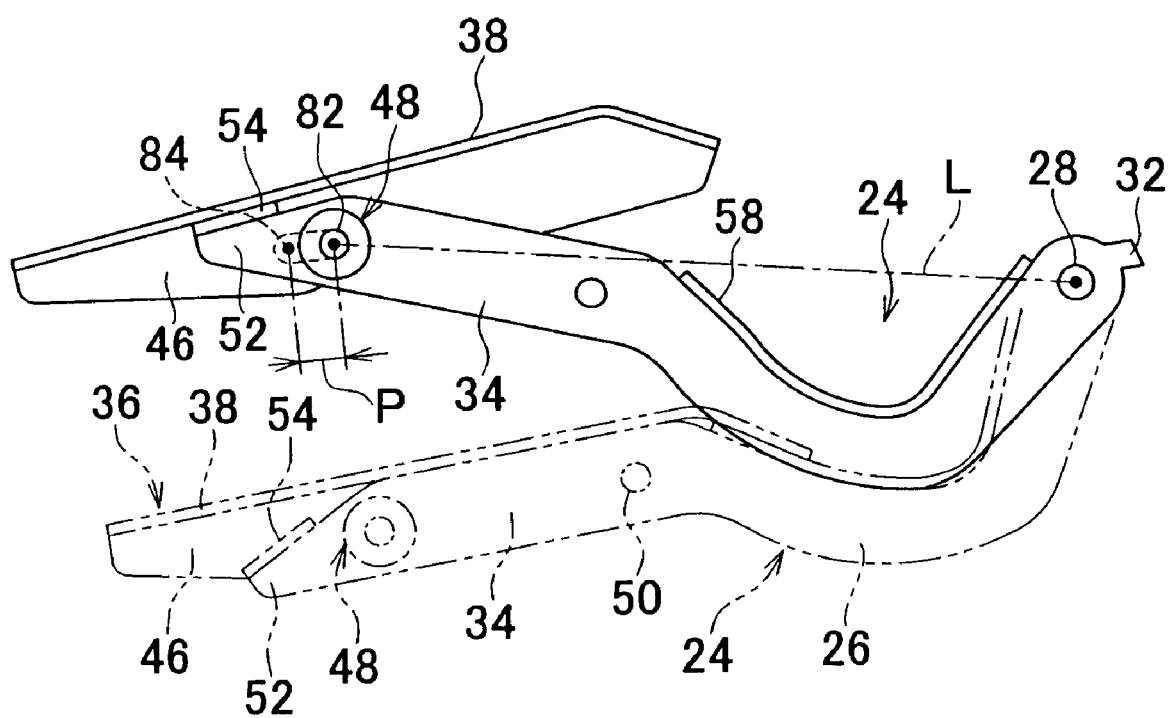
FIG. 4 is a side view showing a direction and a position of a slot.

In addition, as shown in FIG. 4, the slot 84 is set so that, when the connection between the connection leaves 34 and 46 by means of the shear pin 50 is broken, the hinge upper 36 can pivot upward relative to the arm member 24 about the connection portion 48, and, when such upward pivotal movement is completed, the slot 84 is located on the imaginary straight line L passing through both the center of rotation of the rear connecting shaft 28 and the center of the front shaft 82, and the longitudinal axis of the slot 84 lies along the imaginary straight line L. In addition, the longitudinal dimension of the slot 84 is set greater than the sum of the diameter of the shaft 82 and the amount of displacement P between the position that the front shaft 82 takes when the ascent is completed and the position that the front shaft 82 would take when the arm member 24 pivoted upward about the rear connecting shaft 28 with the connection between the connection leaves 34 and 46 by means of the shear pin 50 maintained.

Operations and effects of this embodiment will be described below.

In the vehicle 14 provided with the vehicle pop-up hood apparatus 10, when, in order to open the engine compartment 40 for inspection or the like, the latch 86 (see FIG. 5) coupling the front end portion of the hood 42 and the body of the vehicle 14 is released, and the hood 42 is lifted, the hinge upper 36 is lifted with the hood 42. When the hinge upper 36 is lifted in this way, the hinge upper 36 causes the connection leaf 34 of the arm member 24 to ascend, which in turn causes the arm member 24 to pivot about the rear connecting shaft 28. Although the connection leaf 46 of the hinge upper 36 and the connection leaf 34 of the arm member 24 are connected by the connection portion 48 so as to be pivotable about the front shaft 82, the connection leaves 46 and 34 are also connected with each other by the shear pin 50, so that the hinge upper 36 and the arm member 24 are integrally connected. For this reason, the hinge upper 36 and therefore the hood 42 ascends with the arm member 24 while pivoting about the rear connecting shaft 28.

When the hood 42 ascends in this way, the engine compartment 40 is opened. In addition, when the hood 42 ascends while pivoting about the rear connecting shaft 28 by a predetermined degree, the contact tab 32 is brought into contact with the stopper 30. When the contact tab 32 is in contact with the stopper 30 in this way, pivotal movement of the arm member 24 in the direction such that the hood 42 is lifted is prevented. Thus, it is possible to limit the amount of ascent of the hood 42 to a predetermined amount.

In this embodiment, relative pivotal movement between the connection leaves 34 and 46 (pivotal movement about the shaft 82) is prevented by connecting the connection leaves 34 and 46 with the shear pin 50. However, when the hood 42 is lifted while pivoting the hood 42 about the rear connecting shaft 28 as described above, the hood 42 is urged to pivot downward about the front connection portion 48 on the side, with respect to the front connection portion 48, that is closer to the rear end of the vehicle 14. Such turning force acts to shear the shear pin 50. However, because, in the vehicle pop-up hood apparatus 10, the contact leaf 56 is in contact with the supporting leaf 58, downward pivotal movement of the hinge upper 36 about the connection portion 48 is prevented on the side, with respect to the front connection portion 48, that is closer to the rear end of the vehicle 14.

Because pivotal movement of the hinge upper 36 is prevented in this way, pivotal movement of the hood 42 as described above is prevented. Thus, downward pivotal movement of the hood 42 about the shaft 82 on the side, with respect to the front connection portion 48, that is closer to the rear end of the vehicle 14 is prevented, so that any shearing force caused by such pivotal movement is not exerted on the shear pin 50. For this reason, even when the hood 42 is lifted while pivoting the hood 42 about the rear connecting shaft 28, the connection between the hinge upper 36 and the arm member 24 by means of the shear pin 50 is maintained.

As described above, when the contact tab 32 is in contact with the stopper 30, rearward pivotal movement of the arm member 24 is prevented. However, if the hood 42 further pivoted upward from this state, that is, if the hood were "excessively opened", the hood 42 would pivot relative to the arm member 24 about the rear connecting shaft 28, and the shear pin 50 would be sheared.

In this embodiment, because the contact leaf 56 is in contact with the supporting leaf 58, downward pivotal movement of the hinge upper 36 about the connection portion 48 on the side, with respect to the connection portion 48, that is closer to the rear end of the vehicle 14, is prevented as described above. Thus, pivotal movement of the hood 42 relative to the arm member 24 as described above, that is, excessive opening of the hood 42, is prevented in principle. In addition, because downward pivotal movement of the hinge upper 36 about the connection portion 48 is prevented in this way, even if the hood 42 were excessively opened, the hood 42 pivots with the arm member 24. For this reason, even if the hood 42 were excessively opened, the hood 42 would not pivot relative to the arm member 24, and the shear pin 50 would not be sheared.

Meanwhile, when an ignition signal is sent from the ECU (not shown), and the ignition signal is received by the ignition device in the actuator body 62, the ignition device ignites the gas generating propellant to burn it. When the gas generating propellant burns, gas is generated in the actuator body 62, and the gas raises the internal pressure in the actuator body 62. The thus raised internal pressure in the actuator body 62 causes the piston in the actuator body 62 to slide upward in the axial direction of the actuator body 62.

When the piston moves upward relative to the actuator body 62, the slide shaft 64 integrally joined with the piston ascends, and the pushing portion 66 integrally joined with the slide shaft 64 pushes the base portion 38 of the hinge upper 36 upward. The base portion 38 receives the pushing force (lifting force) exerted by the pushing portion 66, whereby the hood 42 integrally joined with the hinge upper 36 ascends. However, because a front end portion of the hood 42 is coupled to the body of the vehicle 14 by means of the latch 86 as shown in FIG. 5, the hood 42 is urged to ascend in a manner such that the hood 42 pivots about the latch 86 or a point near the latch 86, that is, a front end portion of the hood 42.

As described above, in principle, the arm member 24 and the hinge upper 36 are connected so as to be pivotable relative to each other about the shaft 82. Thus, when the pushing force from the pushing portion 66 is applied to the base portion 38 from below, the hinge upper 36 is urged to pivot relative to the arm member 24 about the shaft 82 so that the side of the hinge upper 36, with respect to the shaft 82, on which the pushing force from the pushing portion 66 is applied ascends. Such pivotal movement of the hinge upper 36 relative to the arm member 24 produces a moment directed so as to shear the shear pin 50 at the portion where the shear pin 50 is provided, which shears (breaks) the shear pin 50. Because the arm member 24 and the hinge upper 36 are integrally connected to each other by the connection portion 48 and the shear pin 50, when the shear pin 50 is sheared, the connection by which the arm member 24 and the hinge upper 36 are integrated is broken.

When the connection by means of the shear pin 50 is broken in this way, the hinge upper 36 becomes pivotable relative to the arm member 24 about the front shaft 82. The pushing force from the pushing portion 66 further applied in this situation causes the hinge upper 36, and therefore the hood 42, to ascend while pivoting about a point at which the hood 42 and the body of the vehicle 14 are coupled to each other by means of the latch 86 or the neighboring point, that is, a front end portion of the hood 42. Because, even in this state, the connection between the arm member 24 and the hinge upper 36 by means of the front connection portion 48 is maintained, an ascent of the hinge upper 36 causes the arm member 24 to ascend while pivoting about the rear connecting shaft 28.

In addition, the hood 42 pivots about the latch 86 or a point near the latch 86, that is, a front end portion of the hood 42 so that the rear-end side of the hood 42 ascends as shown in FIG. 5, whereas the arm member 24 pivots about the rear connecting shaft 28 so that the front-end side of the arm member 24 ascends. Thus, the upward pivotal movement of the hood 42 and the arm member 24 urges the connection leaf 46 of the hinge upper 36 fixed to the hood 42 and the connection leaf 34 of the arm member 24 to move away from each other in the longitudinal direction of the vehicle 14.

The slot 84, which is a component of the connection portion 48, and into which the shaft 82 is inserted, is set so that the slot 84 is positioned on the above-described imaginary straight line L after the upward pivotal movement is completed, and that the longitudinal direction of the slot 84 lies along the imaginary straight line L. In addition, the longitudinal dimension of the slot 84 is set equal to or greater than the sum of the diameter of the shaft 82 and the amount of displacement between the position of the shaft 82 taken when the upward pivotal movement is completed and the position of the shaft 82 taken if the arm member 24 pivoted upward about the rear connecting shaft 28 with the connection between the connection leaves 34 and 46 by means of the shear pin 50 maintained. For this reason, when the connection leaf 46 of the hinge upper 36 and the connection leaf 34 of the arm member 24 are urged to move away from each other in the longitudinal direction of the vehicle 14 as both the arm member 24 and the hood 42 pivot upward, the shaft 82 shifts from the front-end side to the rear-end side of the slot 84 in the longitudinal direction thereof.

Because the shaft 82 shifts along the slot 84 in this way, even when the connection leaf 46 of the hinge upper 36 and the connection leaf 34 of the arm member 24 are urged to move away from each other in the longitudinal direction of the vehicle 14 as both the arm member 24 and the hood 42 pivot upward, the latch 86 is not drawn rearward, and therefore, the latch 86 is not unnecessarily deformed. In addition, even in the case where the hood 42 cannot move rearward because the strength of the latch 86 or the like is set at a high value, both the hood 42 and the arm member 24 can smoothly pivot upward to predetermined positions.

Thereafter, when the hinge upper 36 pivots relative to the arm member 24 about the connection portion 48, and the arm member 24 ascends while pivoting about the rear connecting shaft 28 as described above, the stopper 54 comes close to the base portion 38. When the hinge upper 36 pivots relative to the arm member 24 by a predetermined angle, the stopper 54 is brought into contact with the base portion 38, and pivotal movement of the hinge upper 36 relative to the arm member 24 is thus stopped, so that the arm member 24 and the hinge upper 36, therefore, the hood 42, cannot ascend further. As described above, the hood 42 ascends until the stopper 54 is brought into contact with the base portion 38 to stop the ascent of the hinge upper 36. Thus, it is possible to secure sufficient space (energy absorbing stroke) between the hood 42 and various members and devices, such as an engine, in the engine compartment 40.

In the vehicle pop-up hood apparatus 10, the pushing force applied from the pushing portion 66 to the base portion 38 generates a turning force about the front connection portion 48, and the direction of the turning force (the direction of the moment of the turning force) is such that the shear pin 50 is sheared (broken). Thus, in the vehicle pop-up hood apparatus 10, the pushing force applied to the base portion 38 by the pushing portion 66 has only to be strong enough to lift the hood 42 and shear the shear pin 50. Accordingly, excessive pushing force is not applied from the pushing portion 66 to the hood 42, and excessive reinforcement or the like of the hood 42 is therefore unnecessary.

Although, in this embodiment, the pushing portion 66 pushes the base portion 38 of the hinge upper 36, the same operations and effects as those described above are achieved also when the pushing portion 66 directly pushes the hood 42, as long as the point at which the pushing portion 66 pushes the hood 42 is on the shear pin 50 side with respect to the connection portion 48. However, considering the mechanical strength, the pushing portion 66 preferably pushes the base portion 38 of the hinge upper 36 as described in the description of the embodiment, instead of directly pushing the hood 42. In addition, the thickness of the base portion 38 may be set greater than the thickness of the panel for forming the hood 42, and the pushing force from the pushing portion 66 may be applied to the base portion 38.

In addition, also when the latch 86 is released and the hood 42 is lifted for inspection of the engine, for example, a turning force about the connection portion 48 of the hinge upper 36 is applied to the arm member 24. However, the direction of the turning force in this case is opposite to the direction of the turning force generated when the pushing force from the pushing portion 66 is applied to the base portion 38. In this case, the pivotal movement of the hinge upper 36 relative to the arm member 24 is stopped because the supporting leaf 58 abuts the contact leaf 56. Thus, there is no need to give the shear pin 50 mechanical strength enough to withstand the turning force about the connection portion 48 when the latch 86 is released and the hood 42 is lifted. Accordingly, it is possible to set the mechanical strength of the shear pin 50 at a sufficiently low value, and it is therefore possible to minimize the pushing force that the pushing portion 66 applies to the base portion 38 to lift the hood 42.

In addition, the pivotal movement of the hood 42 that occurs when the latch 86 is released and the hood 42 is lifted is stopped when the contact tab 32 is brought into contact with the stopper 30. On the other hand, when the pushing portion 66 pushes the base portion 38 to lift the hood 42, pivotal movement of the hood 42 is stopped when the stopper 54 is brought into contact with the base portion 38. When the connection between the arm member 24 and the hinge upper 36 by means of the shear pin 50 is broken, and the hinge upper 36 ascends while pivoting relative to the arm member 24 about the connection portion 48, the stopper 54 is brought into contact with the base portion 38 before the contact tab 32 is brought into contact with the stopper 30.

Thus, when the hood 42 is lifted by the pushing force from the pushing portion 66, one of the stopper 30 and the contact tab 32 does not apply load to the other. Accordingly, when performing strength design of the stopper 30 and the contact tab 32, there is no need to consider the case where the hood 42 is lifted by the pushing force from the pushing portion 66, and, in principle, it suffices to consider only the load that is applied when the contact tab 32 is brought into contact with the stopper 30 after the latch 86 is released and the hood 42 is lifted. Thus, it is possible to set the mechanical strength of the stopper 30 and the contact tab 32 at a low value.

In addition, when the stopper 54 is in contact with the base portion 38, the pushing portion 66 does not further push the base portion 38 because the slide stroke of the piston is set so that, when the stopper 54 is brought into contact with the base portion 38, slide movement of the piston in the actuator body 62 is stopped. Accordingly, the pushing force from the pushing portion 66 is not applied to the stopper 54 in this state, and it is therefore possible to set the mechanical strength of the stopper 54 and the base portion 38 at a low value.

Moreover, because pivotal movement of the hood 42 is stopped when the stopper 54 is brought into contact with the base portion 38 in this way, the hood 42 is prevented from being separated from the pushing portion 66 and vertically vibrated (vertically oscillated) due to the impulsive force exerted when the hood 42 is instantaneously lifted by the pushing force from the pushing portion 66.

Each of the stopper 54 and the base portion 38 has a plate shape, and the stopper 54 and the base portion 38 stop pivotal movement of the hood 42 when the surfaces thereof oriented in the respective thickness directions are brought into contact with each other. Thus, the area of the contact surfaces of the stopper 54 and the base portion 38 is larger than that of the stopper 30 and the contact tab 32, and it is easy to increase the contact surface area between the stopper 54 and the base portion 38 by enlarging the outer size of the stopper 54 and the base portion 38. Accordingly, it is easy to give sufficient mechanical strength to the stopper 54 and the base portion 38 for the purpose of restricting upward movement of the hood 42 by means of the stopper 54 and the base portion 38.

Next, another embodiment of the invention will be described. In the description of the following embodiments, the parts basically the same as those of the first embodiment will be designated by the same reference numerals as those of the corresponding parts, and detailed description thereof will be omitted.

Figure 6:
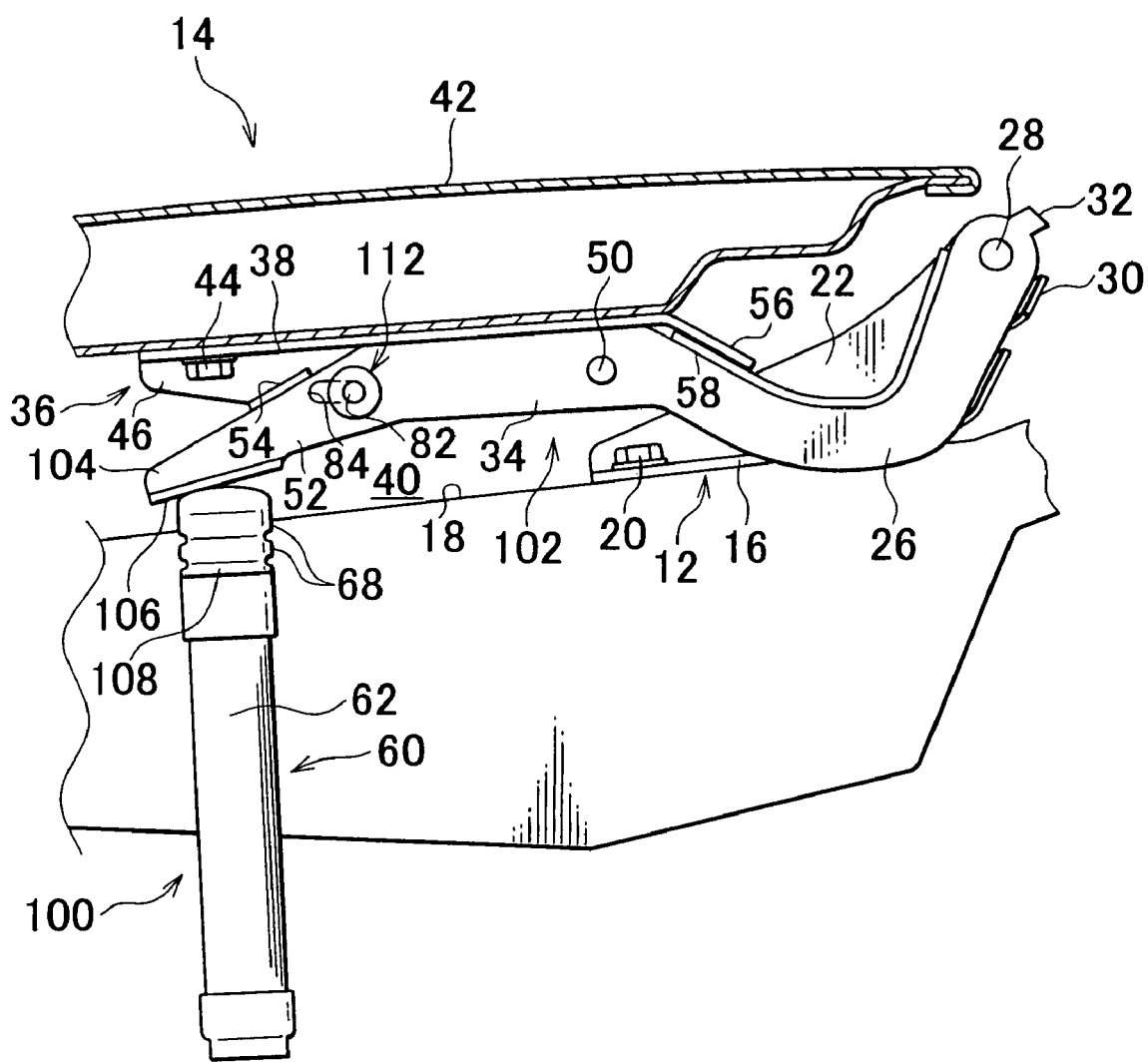
FIG. 6 is a side view showing a configuration of a main portion of a vehicle in which a vehicle pop-up hood apparatus according to a second embodiment of the invention is used.
Figure 7:
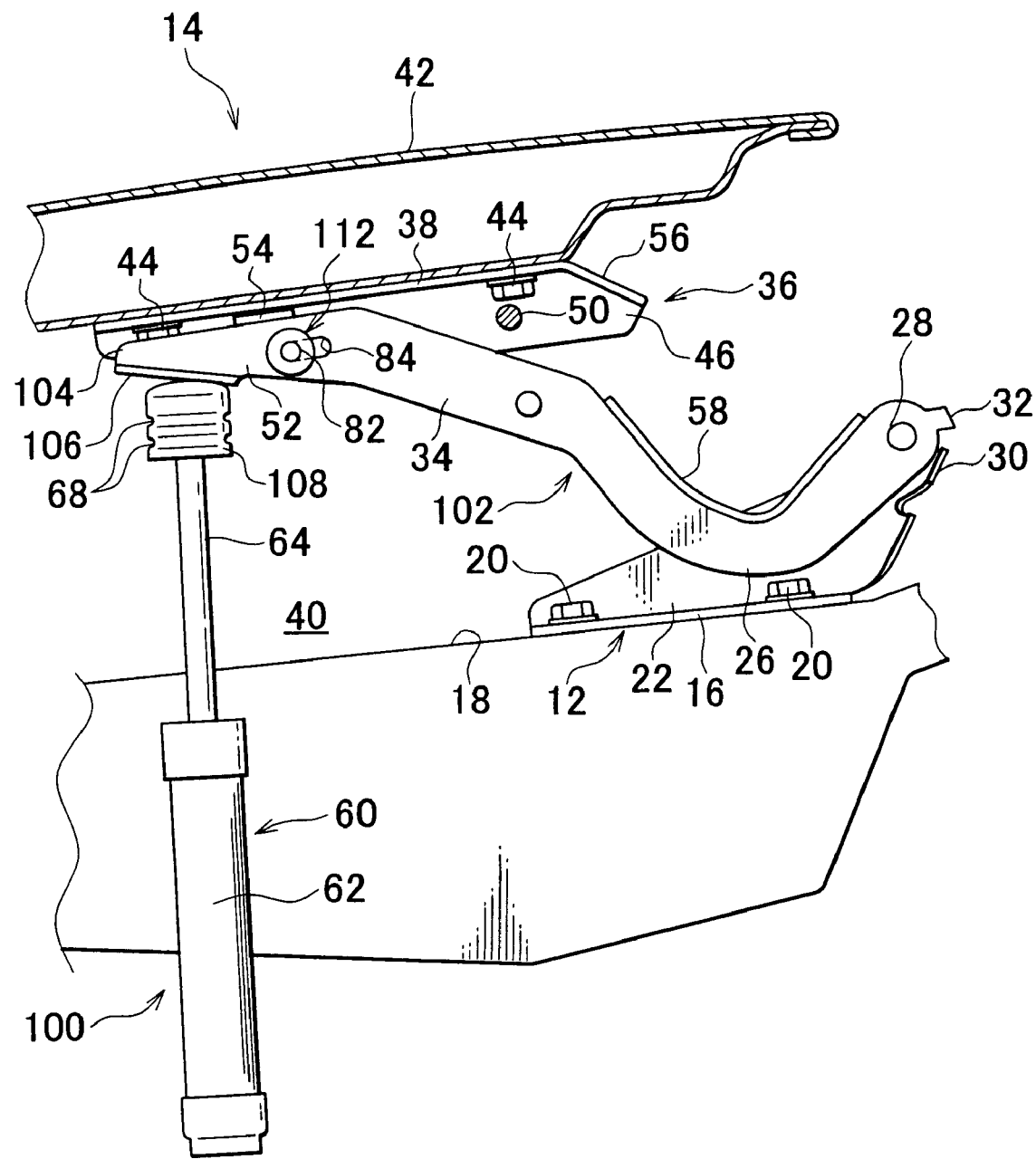
FIG. 7 is a side view corresponding to FIG. 6, showing a state in which the vehicle pop-up hood apparatus according to the second embodiment of the invention is activated.

FIG. 6 shows, in side view, a configuration of a vehicle pop-up hood apparatus 100 according to a second embodiment of the invention. FIG. 7 shows a side view corresponding to FIG. 6, in which the vehicle pop-up hood apparatus 100 is activated.

As shown in FIGS. 6 and 7, the vehicle pop-up hood apparatus 100 is not provided with the arm member 24, but provided with an arm member 102 instead. Although the arm member 102 is the same as the arm member 24 in including the arm body 26, the contact tab 32, the connection leaf 34, the stopper extension leaf 52, the stopper 54, and the supporting leaf 58, the arm member 102 differs from the arm member 24 in including a pushing force-receiving extension leaf 104 and a pushing force-receiving leaf 106. The pushing force-receiving extension leaf 104 has a shape of a plate of which the thickness direction coincides with the thickness direction of the stopper extension leaf 52. The pushing force-receiving extension leaf 104 is continuously extended from the stopper extension leaf 52 toward the front side of the vehicle 14.

The pushing force-receiving leaf 106 is extended from a lower edge portion of the pushing force-receiving extension leaf 104 in a thickness direction of the pushing force-receiving extension leaf 104. The pushing force-receiving extension leaf 104 has a shape of a plate of which the thickness direction substantially coincides with the vertical direction of the vehicle 14 when the engine compartment 40 is closed by the hood 42. A pushing portion 108 is positioned under the pushing force-receiving leaf 106. Instead of the pushing portion 66, the pushing portion 108 is provided at the tip of the slide shaft 64. The configuration of the pushing portion 108 is basically the same as that of the pushing portion 66, except that the top surface is formed into a curved surface that is curved so as to be convex upward in the axial direction of the pushing portion 108. The top surface (curved surface) of the pushing portion 108 is in contact with the undersurface of the pushing force-receiving leaf 106.

The vehicle pop-up hood apparatus 100 is not provided with the connection portion 48, but provided with a connection portion 112 instead, which serves as the first connection section of the connection mechanism. In the connection portion 112, the shaft 82 is provided on the connection leaf 46 of the hinge upper 36, and the slot 84 is formed in the connection leaf 34 of the arm member 102. In the initial state, the shaft 82 is positioned on the rear-end side of the slot 84.

In the vehicle pop-up hood apparatus 100 characterized by the above-described configuration, when the internal pressure in the actuator body 62 rises and the slide shaft 64 slides upward, the pushing portion 108 pushes the pushing force-receiving leaf 106 upward. The arm member 102 that receives the pushing force from the pushing portion 108 at the pushing force-receiving leaf 106 is urged to ascend while pivoting about the rear connecting shaft 28. In addition, the arm member 102 is connected to the hinge upper 36 so as to be pivotable relative to the hinge upper 36 about the front shaft 82, so that, when the arm member 102 is urged to ascend while pivoting as described above, the arm member 102 is urged to pivot relative to the hinge upper 36 about the shaft 82.

The turning force that urges the arm member 102 to pivot relative to the hinge portion 36 about the front shaft 82 has a moment directed so as to shear the shear pin 50 at the portion where the shear pin 50 is provided which shears (breaks) the shear pin 50. When the integrative connection between the arm member 102 and the hinge upper 36 is broken in this way, the hinge upper 36 becomes pivotable relative to the arm member 102 about the front shaft 82. As shown in FIG. 7, the pushing force from the pushing portion 108 further applied in this situation causes the hinge upper 36, and therefore the hood 42, to ascend while pivoting about a point at which the hood 42 is coupled to the body of the vehicle 14 by means of the latch 86 or the neighboring point, that is, a front end portion of the hood 42.

As will be understood from the above description, also in the vehicle pop-up hood apparatus 100, the pushing force applied to the pushing force-receiving leaf 106 by the pushing portion 108 has only to be strong enough to lift the hood 42 and shear the shear pin 50. Accordingly, in the vehicle pop-up hood apparatus 100, excessive pushing force is not applied from the pushing portion 108 to the hood 42 as in the case of the vehicle pop-up hood apparatus 10 according to the first embodiment, and excessive reinforcement or the like of the hood 42 is therefore unnecessary. In addition, because the arm member 102 includes the contact tab 32, the stopper 54, and the supporting leaf 58, the operations and effects similar to those achieved by the first embodiment, relating to this configuration, are achieved.

As described in connection with the first embodiment, when the hood 42 pivots about the latch 86 or the neighboring point, that is, a front end portion of the hood 42 so that the rear-end side of the hood 42 ascends, and at the same time, the arm member 102 pivots about the rear connecting shaft 28 so that the front-end side of the arm member 102 ascends, the connection leaf 46 of the hinge upper 36 and the connection leaf 34 of the arm member 102 are urged to move away from each other in the longitudinal direction of the vehicle 14.

In this embodiment, when the connection leaf 46 of the hinge upper 36 and the connection leaf 34 of the arm member 102 move away from each other in the longitudinal direction of the vehicle 14 as both the arm member 102 and the hood 42 pivot upward, the shaft 82 shifts from the rear-end side to the front-end side in the slot 84 in the longitudinal direction.

Thus, as in the case of the first embodiment, even when the connection leaf 46 of the hinge upper 36 and the connection leaf 34 of the arm member 102 move away from each other in the longitudinal direction of the vehicle 14 as both the arm member 102 and the hood 42 pivot upward, the latch 86 is not drawn rearward, and the latch 86 is not unnecessarily deformed because the shaft 82 shifts along the slot 84. In addition, even when the hood 42 cannot move rearward because the strength of the latch 86 or the like is set high, both the hood 42 and the arm member 24 can smoothly pivot upward to the predetermined positions.

When the pushing force-receiving leaf 106 is pushed by the pushing portion 108 that is ascending, and the arm member 102 ascends while pivoting about the rear connecting shaft 28, the orientation of the undersurface of the pushing force-receiving leaf 106 is gradually turned toward the front side of the vehicle 14. On the other hand, the top surface of the pushing portion 108 that is in contact with the pushing force-receiving leaf 106 is formed into a curved surface that is curved so as to be convex upward in the axial direction of the pushing portion 108. Thus, even when the orientation of the undersurface of the pushing force-receiving leaf 106 varies as described above, the contact surface area between the pushing portion 108 and the pushing force-receiving leaf 106 is not significantly varied, and the state of the contact between the pushing portion 108 and the pushing force-receiving leaf 106 is maintained. Accordingly, the operation of pushing the pushing force-receiving leaf 106 performed by the pushing portion 108 is stabilized, and, as a result, ascent of the arm member 102, and therefore the hood 42, is stabilized.

A third embodiment of the invention will be described.

Figure 8:
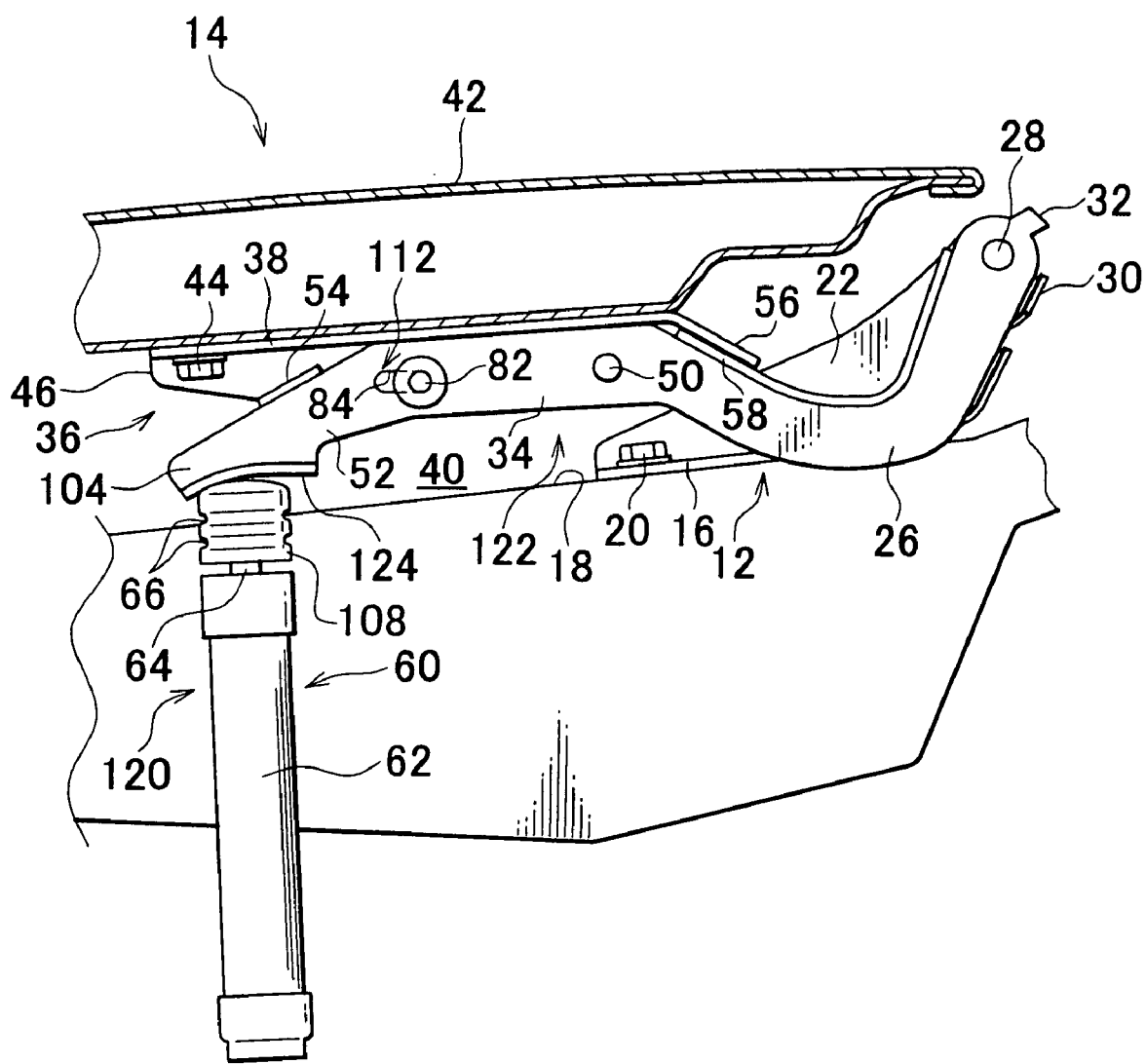
FIG. 8 is a side view showing a configuration of a main portion of a vehicle in which a vehicle pop-up hood apparatus according to a third embodiment of the invention is used.
Figure 9:
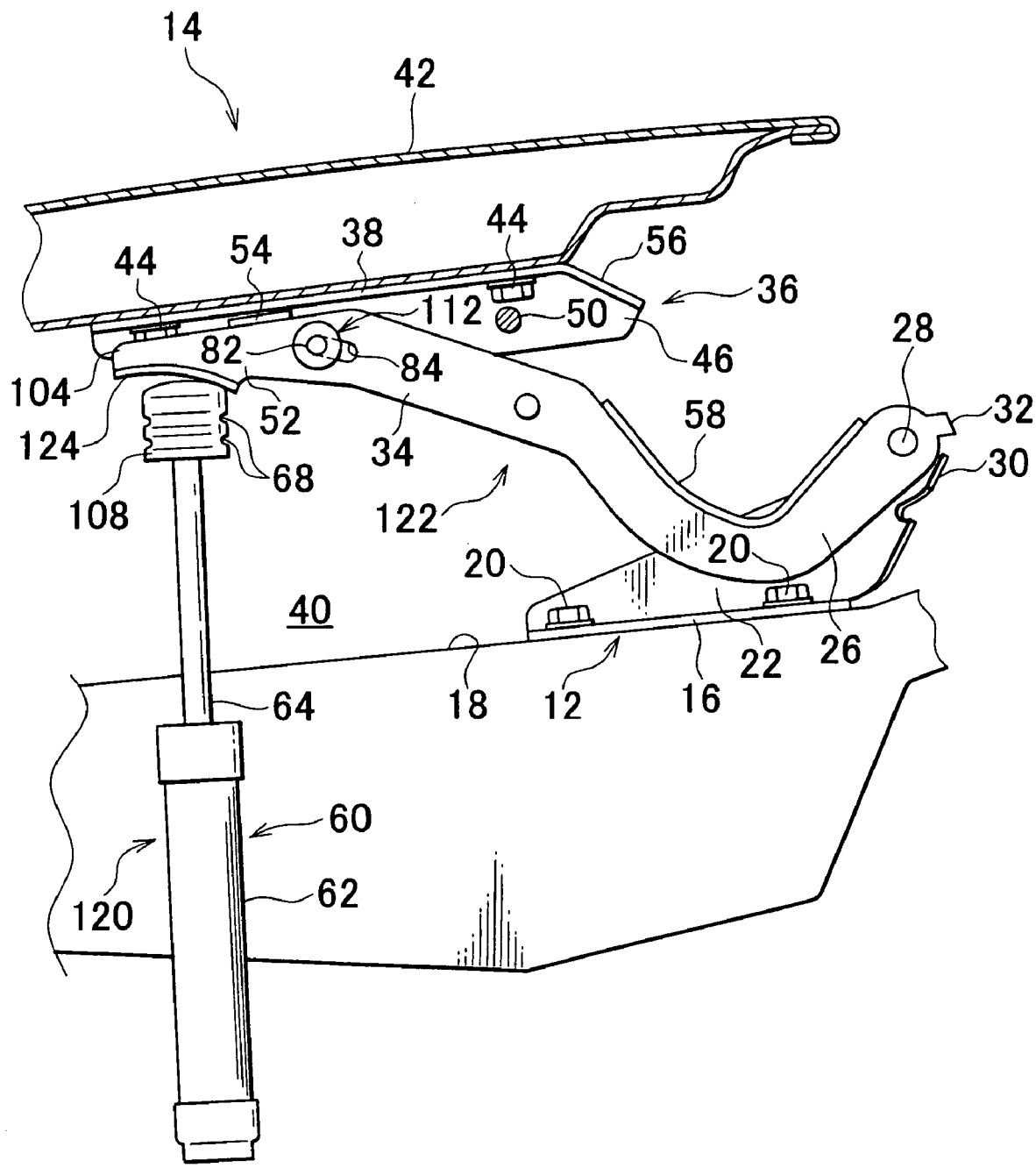
FIG. 9 is a side view corresponding to FIG. 8, showing a state in which the vehicle pop-up hood apparatus according to the third embodiment of the invention is activated.

FIG. 8 shows a configuration of a vehicle pop-up hood apparatus 120 according to this embodiment in side view. FIG. 9 shows a side view corresponding to FIG. 8, in which the vehicle pop-up hood apparatus 120 is activated.

As shown in FIGS. 8 and 9, the vehicle pop-up hood apparatus 120 is not provided with the arm member 102, but provided with an arm member 122 instead. Although the arm member 122 is provided with the pushing force-receiving extension leaf 104 as in the case of the arm member 102, the pushing force-receiving extension leaf 104 of the arm member 122 is not provided with the pushing force-receiving leaf 106, but provided with a pushing force-receiving leaf 124 instead.

Although the pushing force-receiving leaf 124 has a plate-like shape, the pushing force-receiving leaf 124 differs from the flat pushing force-receiving leaf 106 in that the pushing force-receiving leaf 124 is curved about the axis extending in the lateral direction of the vehicle 14 so that the pushing force-receiving leaf 124 entirely faces downward with respect to the vehicle 14. The curvature radius of the undersurface of the pushing force-receiving leaf 124 that faces downward with respect to the vehicle 14 is sufficiently greater than the curvature radius of the top surface of the pushing portion 108. A top end portion of the pushing portion 108 is positioned in the hollow defined by the undersurface of the pushing force-receiving leaf 124, and the top surface of the pushing portion 108 is in contact with the undersurface of the pushing force-receiving leaf 124.

The configuration of the vehicle pop-up hood apparatus 120 having the above-described configuration is basically the same as that of the vehicle pop-up hood apparatus 100 according to the second embodiment. Thus, the operations and effects similar to those achieved by the vehicle pop-up hood apparatus 100 are achieved also by the vehicle pop-up hood apparatus 120.

In addition, as described above, the undersurface of the pushing force-receiving leaf 124 with which the top surface of the pushing portion 108 is in contact is curved about the axis extending in the lateral direction of the vehicle 14, that is, about the axis extending in the direction substantially parallel to those of the axes about which the arm member 122 and the hood 42 pivot and ascend. Thus, even when the arm member 122 pivots about the rear connecting shaft 28, the contact surface area between the pushing portion 108 and the pushing force-receiving leaf 124 is not significantly varied, and the state of the contact between the pushing portion 108 and the pushing force-receiving leaf 124 is maintained. Accordingly, the operation of pushing the pushing force-receiving leaf 124 performed by the pushing portion 108 is stabilized, and, as a result, ascent of the arm member 102, and therefore the hood 42, is stabilized.

Next, a fourth embodiment of the invention will be described.

Figure 10:
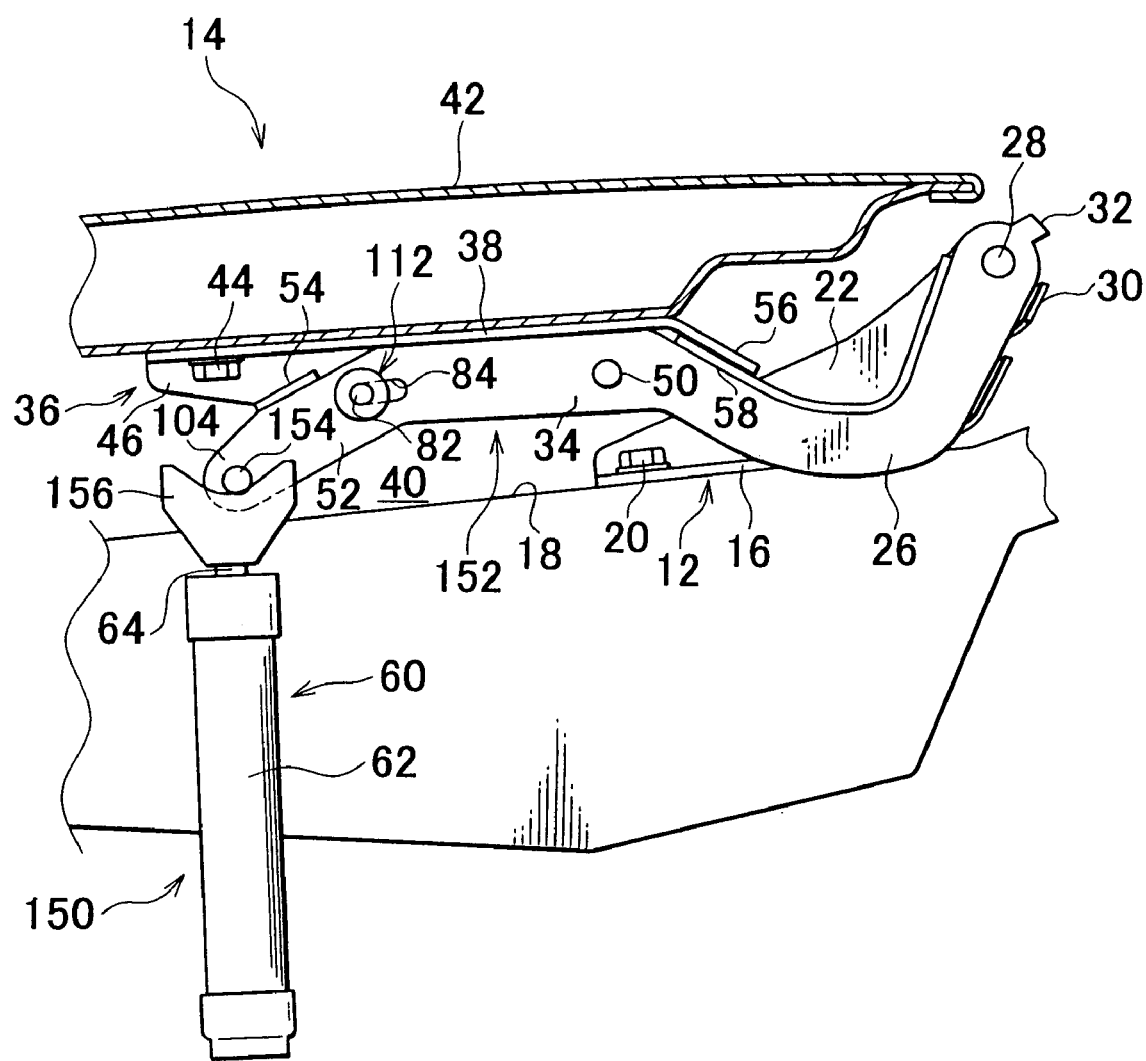
FIG. 10 is a side view showing a configuration of a main portion of a vehicle in which a vehicle pop-up hood apparatus according to a fourth embodiment of the invention is used.
Figure 11:
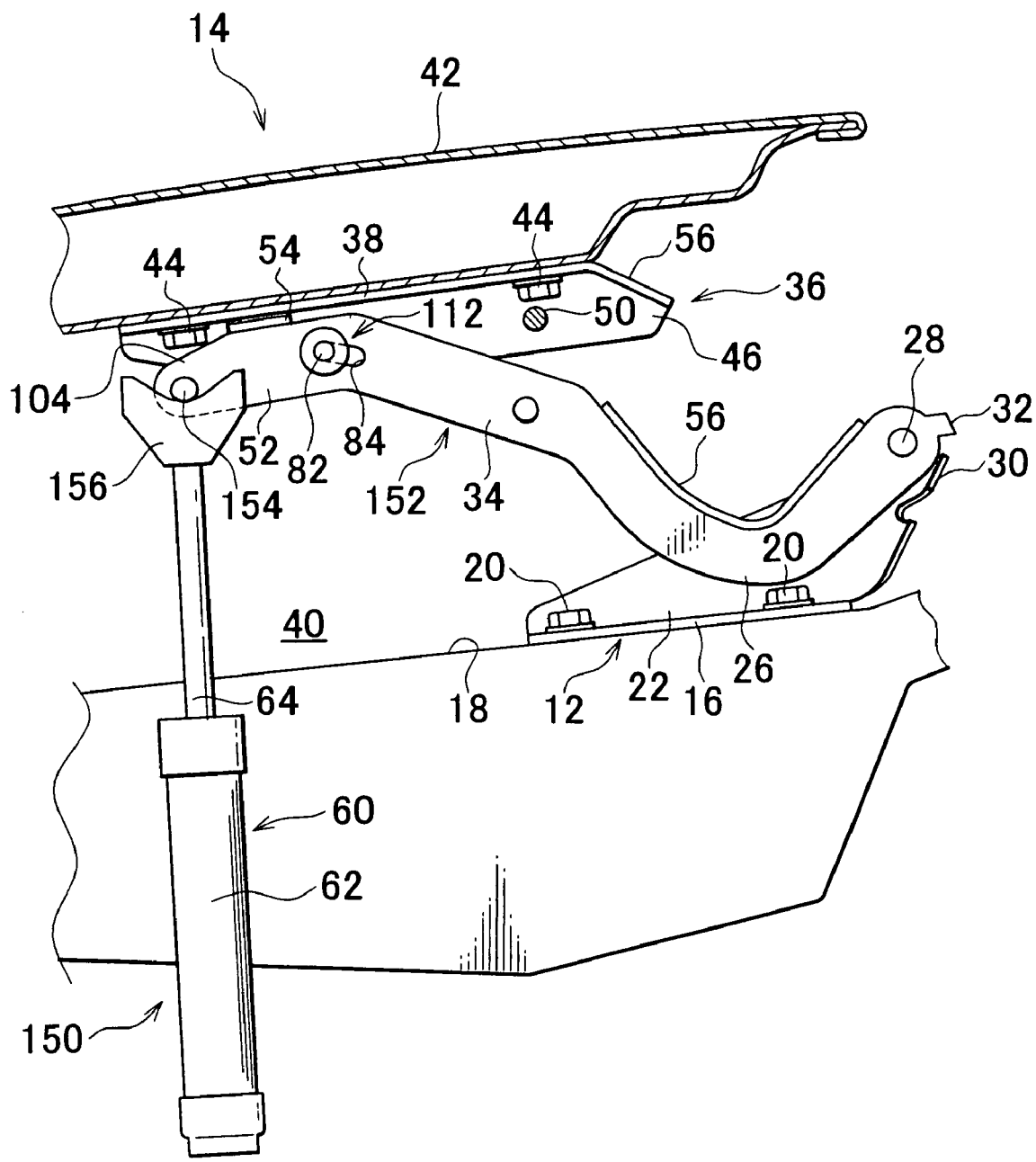
FIG. 11 is a side view corresponding to FIG. 10, showing a state in which the vehicle pop-up hood apparatus according to the fourth embodiment of the invention is activated.

FIG. 10 shows a configuration of a vehicle pop-up hood apparatus 150 according to this embodiment in side view. FIG. 11 shows a side view corresponding to FIG. 10, in which the vehicle pop-up hood apparatus 150 is activated.

As shown in FIGS. 10 and 11, the vehicle pop-up hood apparatus 150 is not provided with the arm member 102, but provided with an arm member 152 instead. Although the arm member 152 is not provided with the pushing force-receiving extension leaf 104 as in the case of the arm member 102, the pushing force-receiving extension leaf 104 of the arm member 152 is provided with the pushing force-receiving leaf 106, but provided with a pushing force-receiving pin 154 instead. The pushing force-receiving pin 154 is a columnar shaft member of which the axis extends in the lateral direction of the vehicle 14. The pushing force-receiving pin 154 protrudes on one side of the pushing force-receiving extension leaf 104 extending in the longitudinal direction of the vehicle 14.

Meanwhile, in the vehicle pop-up hood apparatus 150, the pushing portion 108 is not provided at the tip of the slide shaft 64. Instead of the pushing portion 108, a pushing portion 156 is provided at the tip of the slide shaft 64. The pushing portion 156 has a curved surface that is curved about the axis extending in the lateral direction of the vehicle 14 so that the top end portion of the pushing portion 156 is open upward. The curvature radius of the curved surface of the top end portion of the pushing portion 156 is sufficiently greater than the radius of the perimeter of the pushing force-receiving pin 154, and the pushing force-receiving pin 154 is in contact with the inner surface of the pushing portion 156 in the hollow defined by the top end portion of the pushing portion 156.

In the vehicle pop-up hood apparatus 150 characterized by the above-described configuration, when the internal pressure in the actuator body 62 rises and the slide shaft 64 slides upward, the pushing portion 156 pushes the pushing force-receiving pin 154 upward. The arm member 152 that receives the pushing force from the pushing portion 156 at the pushing force-receiving pin 154 is urged to ascend while pivoting about the rear connecting shaft 28. In addition, the arm member 152 is connected to the hinge upper 36 so as to be pivotable relative to the hinge upper 36 about the shaft 82 (the connection portion 112), so that, when the arm member 152 is urged to ascend while pivoting about the connecting shaft 28, the arm member 152 is urged to pivot relative to the hinge upper 36 about the shaft 82 (the connection portion 112).

The turning force that urges the arm member 152 to pivot relative to the hinge portion 36 about the front shaft 82 has a moment directed so as to shear the shear pin 50 at the portion where the shear pin 50 is provided, which shears (breaks) the shear pin 50. When the integrative connection between the arm member 152 and the hinge upper 36 is broken in this way, the hinge upper 36 becomes pivotable relative to the arm member 152 about the shaft 82. As shown in FIG. 11, the pushing force from the pushing portion 156 further applied in this situation causes the hinge upper 36, and therefore the hood 42, to ascend while pivoting about the latch 86 or a point near the latch 86, that is, a front end portion of the hood 42.

In other words, in principle, the operations and effects similar to those achieved by the second embodiment are achieved also by this embodiment.

The pushing force-receiving pin 154 has a columnar shape of which the axis extends in the lateral direction of the vehicle 14, that is, a columnar shape of which the axis extends in the direction substantially parallel to those of the axes about which the arm member 152 and the hood 42 pivot and ascend.

In addition, with regard to the configuration of the top end portion of the pushing portion 156 that is in contact with the outer surface of the pushing force-receiving pin 154, the top end portion of the pushing portion 156 is curved about the axis extending in the lateral direction of the vehicle 14 so that the top end portion is open upward. Thus, even when the pushing portion 156 ascending pushes the pushing force-receiving portion 154 to cause the arm member 154 to pivot about the rear connecting shaft 28, the contact surface area between the pushing portion 156 and the pushing force-receiving pin 154 is not significantly varied, and the state of the contact between the pushing portion 156 and the pushing force-receiving pin 154 is maintained. Accordingly, the operation of pushing the pushing force-receiving pin 154 performed by the pushing portion 156 is stabilized, and, as a result, ascent of the arm member 152, and therefore the hood 42, is stabilized.

Figure 12:
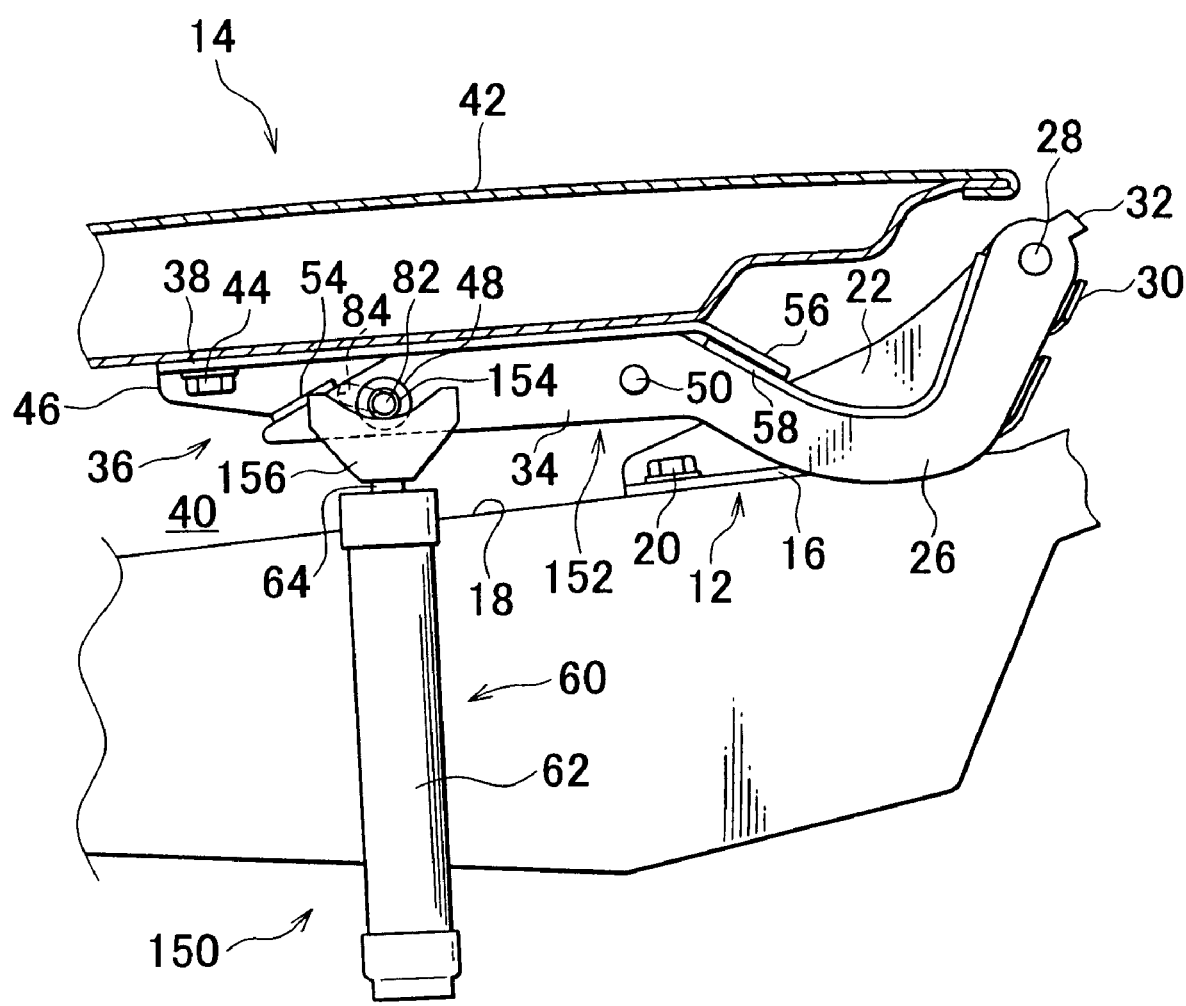
FIG. 12 is a side view corresponding to FIG. 10, showing a modification of the vehicle pop-up hood apparatus according to the fourth embodiment of the invention.

In this embodiment, the pushing force-receiving pin 154 is provided on the side, with respect to the connection portion 112, that is closer to the tip of the arm member 152, that is, the side opposite to the shear pin 50 with respect to the connection portion 112. However, as shown in FIG. 12, the pushing force-receiving pin 154 may be provided coaxially with the connection portion 112, and the pushing force-receiving pin 154 may be pushed by the pushing portion 156. Specifically, when a configuration is adopted in which the lifting force from the slide shaft 64 ascending is applied to the arm member 152 to lift the hood 42 through the hinge upper 36, the point at which the lifting force from the slide shaft 64 is applied to the arm member 152 may be the center of pivotal movement about the connection portion 112, or on the side opposite to the shear pin 50 with respect to the center of pivotal movement about the connection portion 112.

Next, a fifth embodiment of the invention will be described.

Figure 13:
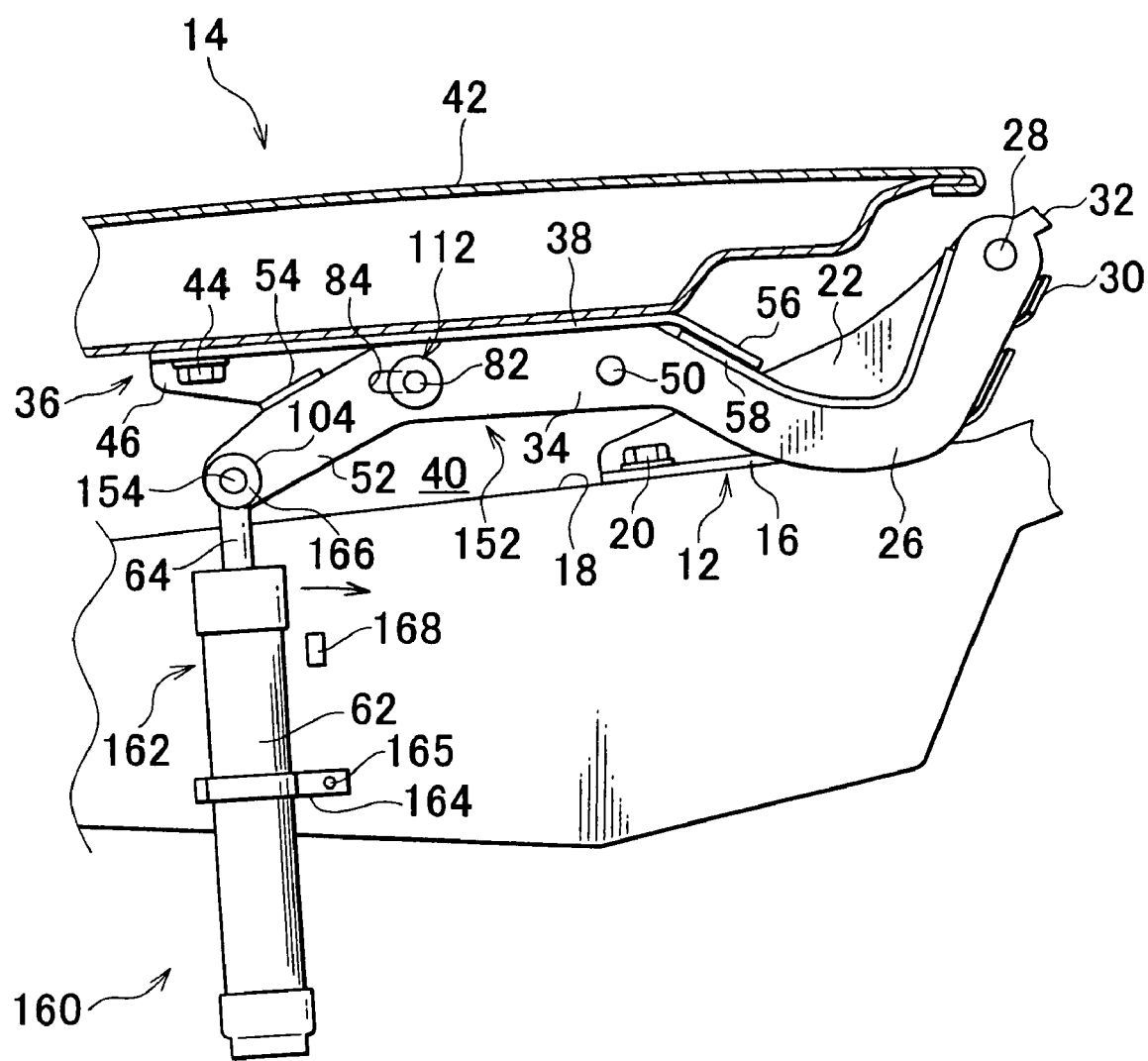
FIG. 13 is a side view showing a configuration of a main portion of a vehicle in which a vehicle pop-up hood apparatus according to a fifth embodiment of the invention is used.

FIG. 13 shows a configuration of a vehicle pop-up hood apparatus 160 according to this embodiment in side view.

As shown in FIG. 13, the vehicle pop-up hood apparatus 160 is not provided with the actuator 60, but provided with an actuator 162 instead. The actuator 162 is provided with a holding bracket 164 for holding the actuator body 62. The holding bracket 164 is fixed to a side of the cowl top 18 with a fixing shaft 165 so as to be pivotable about the axis extending in the lateral direction of the vehicle 14.

In addition, a connecting member 166 is provided at the tip of the slide shaft 64, which is a component of the actuator 162. The connecting member 166 has a shape of a plate of which the thickness direction is made to coincide with the lateral direction of the vehicle 14. The pushing force-receiving pin 154 is passed through the connecting member 166 from one side of the connecting member 166 in the thickness direction of the connecting member 166, and the connecting member 166 is pivotable about the pushing force-receiving pin 154.

Moreover, a stopper 168 is provided on a side of the cowl top 18 in the vehicle pop-up hood apparatus 160. When the actuator body 62 held by the holding bracket 164 pivots about the fixing shaft 165 in one direction by a predetermined angle, the stopper 168 is brought into contact with the actuator body 62, so that further pivotal movement of the actuator body 62 about the fixing shaft 165 in the one direction is stopped.

In the vehicle pop-up hood apparatus 160 characterized by the above-described configuration, when the internal pressure in the actuator body 62 rises and the slide shaft 64 slides upward, the connecting member 166 pushes the pushing force-receiving pin 154 upward. When the pushing force-receiving pin 154 receives the pushing force, the arm member 152 pivots relative to the hinge upper 36 about the shaft 82 (the connection portion 112) to shear the shear pin 50, and at the same time, the hinge upper 36, and therefore the hood 42, ascends while pivoting about the latch 86 or a point near the latch 86, that is, a front end portion of the hood 42, as in the case of the fourth embodiment.

In other words, in principle, the operations and effects similar to those achieved by the fourth embodiment are achieved also by this embodiment.

When the arm member 152 ascends, the arm member 152 pivots about the rear connecting shaft 28, and therefore, the pushing force-receiving pin 154 moves rearward while ascending, and the connecting member 166 is drawn rearward by the pushing force-receiving pin 154. When the connecting member 166 is drawn in this way, the actuator body 62 pivots about the fixing shaft 165 with the holding bracket 164 so that the top end portion of the actuator body 62 moves rearward. In addition, when the axial direction of the actuator body 62 is inclined due to the pivotal movement of the actuator body 62, the connecting member 166 correspondingly rotates about the pushing force-receiving pin 154.

Thus, in this embodiment, even when the arm member 152 pivots, the position at which the connecting member 166 and the pushing force-receiving pin 154 are joined, that is, the point at which the pushing force generated by sliding movement of the slide shaft 64 is applied to the arm member 152, is unchanged, so that it is possible to stably apply the pushing force to the arm member 152 to stably lift the arm member 152.

In addition, when the actuator body 62 pivots about the fixing shaft 165 by a predetermined angle, which is, for example, the angle corresponding to the rotational position of the arm member 152 that is reached when the ascent of the hood 42 is completed, the stopper 168 is brought into contact with the actuator body 62, and stops further pivotal movement of the actuator body 62. Thus, it is possible to stabilize the position of the actuator body 62 taken when the ascent of the hood 42 is completed, and it is therefore possible to stably support the hood 42 as it is positioned when the ascent is completed.

Next, a sixth embodiment of the invention will be described.

Figure 14:
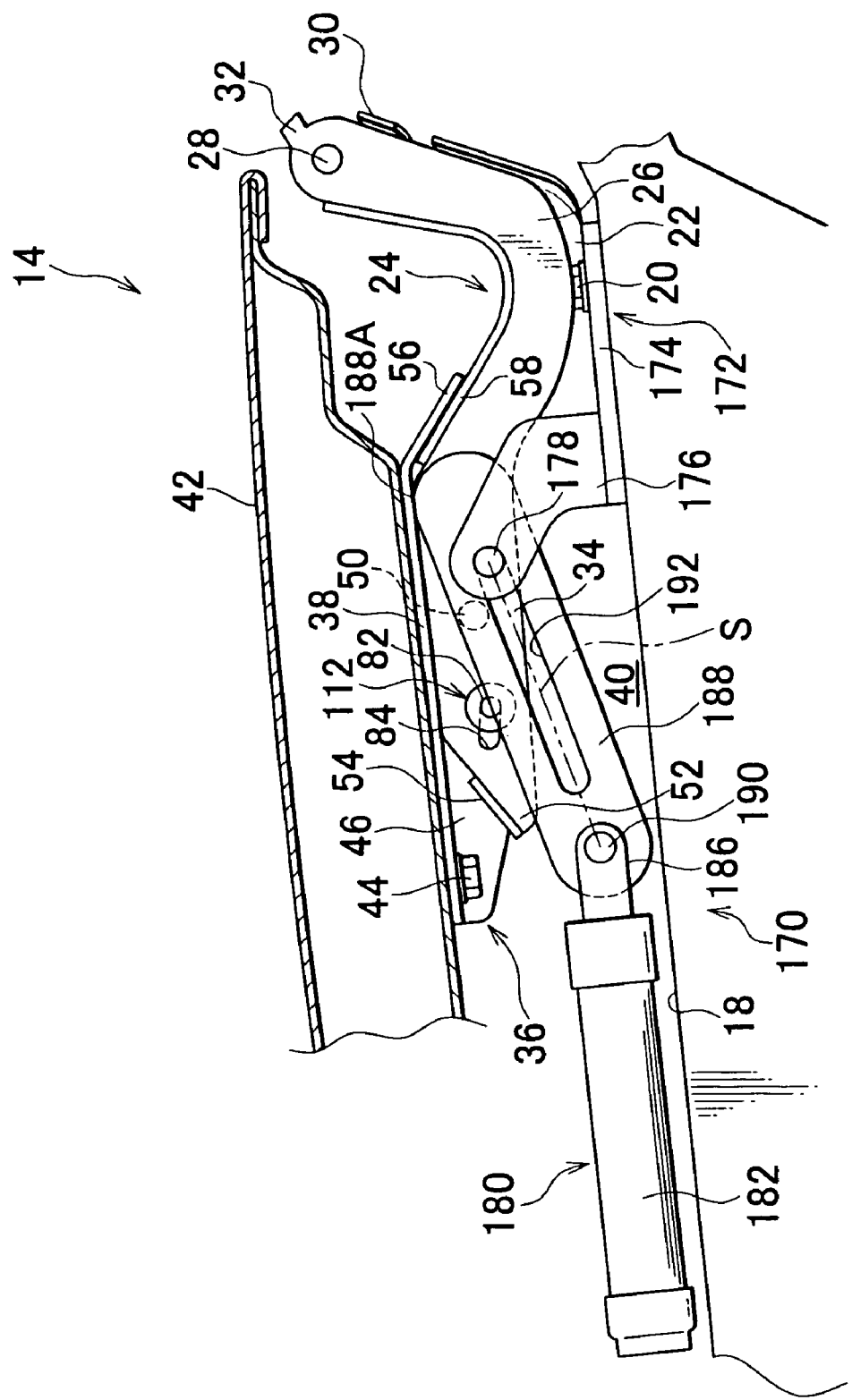
FIG. 14 is a side view showing a configuration of a main portion of a vehicle in which a vehicle pop-up hood apparatus according to a sixth embodiment of the invention is used.
Figure 15:
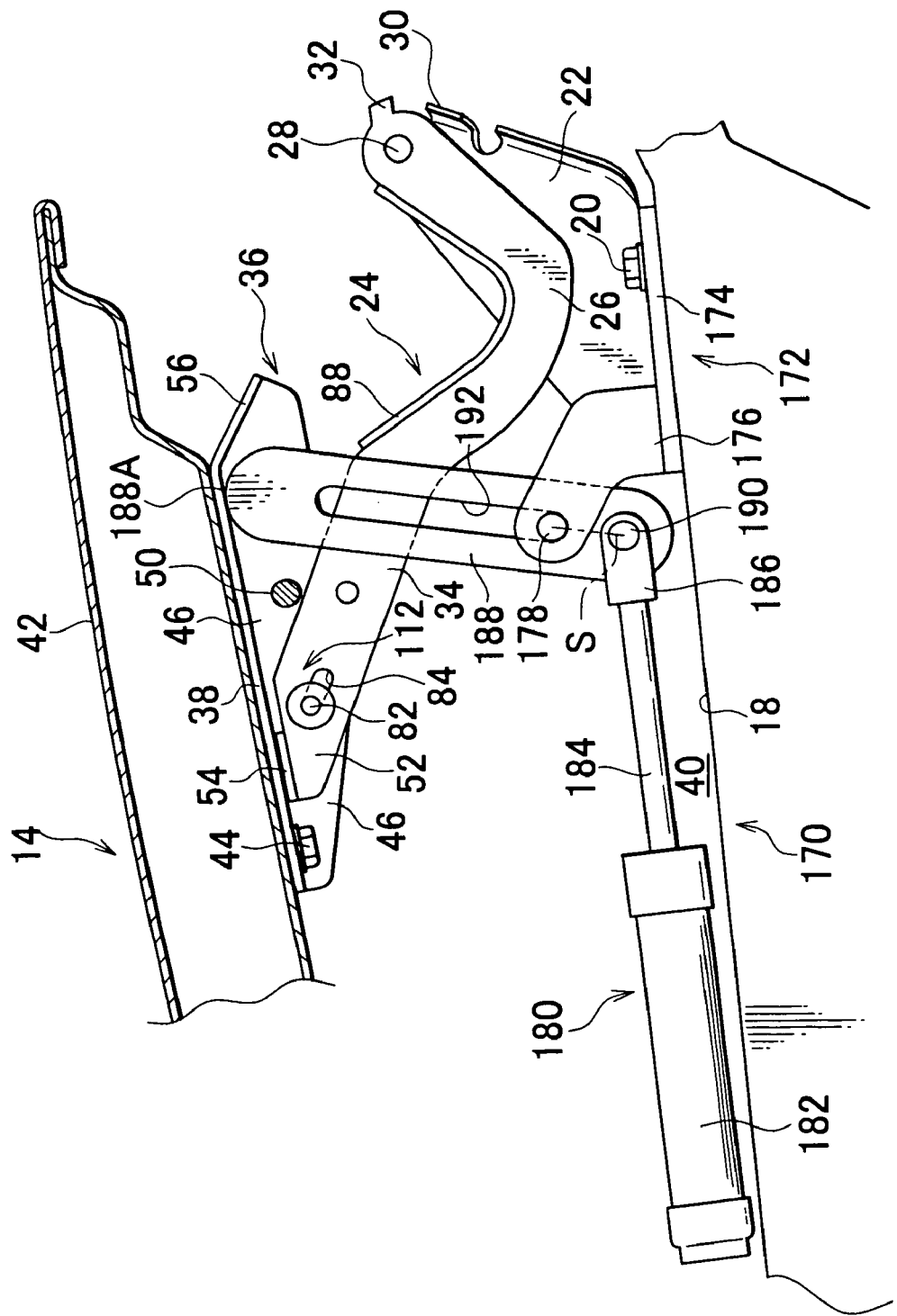
FIG. 15 is a side view corresponding to FIG. 14, showing a state in which the vehicle pop-up hood apparatus according to the sixth embodiment of the invention is activated.

FIG. 14 shows, in side view, a configuration of a vehicle pop-up hood apparatus 170 according to the sixth embodiment. FIG. 15 shows a side view corresponding to FIG. 14, in which the vehicle pop-up hood apparatus 170 is activated.

As shown in FIGS. 14 and 15, the vehicle pop-up hood apparatus 170 is not provided with the hinge base 12, but provided with a hinge base 172 instead. The hinge base 172 is not provided with the base portion 16, but provided with a base portion 174 instead. The configuration of the base portion 174 is basically the same as that of the base portion 16 in that the base portion 174 is fixed to the cowl top 18 with the bolts 20, and that the supporting portion 22 is provided. However, the configuration of the base portion 174 differs from that of the base portion 16 in that a supporting wall 176 is disposed in a standing position on the front-end side of the base portion 174. The supporting wall 176 has a shape of a plate of which the thickness direction coincides with the lateral direction of the vehicle 14. An engagement pin 178, which is a component of the conversion portion, protrudes from one side of the supporting wall 176 with respect to the thickness direction of the supporting wall 176. The engagement pin 178 has a round column shape of which the axis extends in the lateral direction of the vehicle 14.

Meanwhile, the vehicle pop-up hood apparatus 170 is not provided with the actuator 60, but provided with an actuator 180 instead. The actuator 180 includes an actuator body 182, which is, by means of a bracket or the like, integrally fixed to the cowl top 18 of the vehicle 14 or a portion of the body of the vehicle 14 other than the cowl top 18, on the upper side of the cowl top 18. The configuration of the actuator body 182 is basically the same as that of the actuator body 62 of the actuator 60. However, the axis of the actuator body 62 extends substantially in the vertical direction of the vehicle 14, whereas the axis of the actuator body 182 extends substantially in the longitudinal direction of the vehicle 14. When the internal pressure in the actuator body 182 rises, a piston in the actuator body 182 slides toward the rear side of the vehicle 14 along the actuator body 182.

As shown in FIG. 15, the actuator 180 includes a slide shaft 184, which functions as the slide member. The slide shaft 184 is integrally fixed to the piston in the actuator body 182 on the longitudinal proximal end side of the slide shaft 184. A rise in the internal pressure in the actuator body 182 causes the slide shaft 184 to slide toward the rear of the vehicle 14 with the piston. A supporting member 186 is integrally fixed to the tip of the slide shaft 184, outside the actuator body 182. The supporting member 186 has a shape of a plate of which the thickness direction coincides with the lateral direction of the vehicle 14. A link member 188, which constitutes the conversion portion along with the engagement pin 178, is disposed on one side of the supporting member 186 with respect to the thickness direction thereof.

The link member 188 has a shape of a plate of which the thickness direction coincides with the lateral direction of the vehicle 14. A connecting shaft 190, which constitutes the conversion portion along with the engagement pin 178 and the link member 188, is provided for the supporting member 186 below the engagement pin 178. The axis of the connecting shaft 190 extends in the lateral direction of the vehicle 14, and the connecting shaft 190 connects the link member 188 to the supporting member 186 so that the link member 188 can pivot relative to the supporting member 186 about the connecting shaft 190. A slot 192 is formed in the link member 188, beside the connecting shaft 190, along the longitudinal axis of the link member 188.

The slot 192 is substantially linearly elongated in the longitudinal direction of the link member 188, and passes through the link member 188 in the thickness direction thereof. The tip side of the engagement pin 178 is inserted into the slot 192. The width of opening of the slot 192, which is the dimension along the direction perpendicular to the longitudinal direction of the slot 192, is set slightly greater than the outer diameter of the engagement pin 178. Thus, the link member 188 can pivot about the engagement pin 178, and can move relative to the engagement pin 178 in the longitudinal direction of the slot 192 until the engagement pin 178 is brought into contact with one of the ends of the slot 192 in the longitudinal direction thereof. An end portion 188A opposite to the connection between the link member 188 and the connecting shaft 190 is in contact with the base portion 38 from below the base portion 38, which is a part of the hinge upper 36, on the side opposite to the connection portion 112 with respect to the shear pin 50.

In the vehicle pop-up hood apparatus 170 characterized by the above-described configuration, as in the case of the actuator body 62 according to the first to fourth embodiments, when the gas generating propellant is burned to generate gas in the actuator body 182, and the internal pressure in the actuator body 182 is raised by the gas, the piston in the actuator body 182 slides toward one end side of the actuator body 182 in the axial direction, that is, toward the rear of the vehicle 14. Such movement of the piston causes the slide shaft 184 integrally joined to the piston to move toward the rear of the vehicle 14

Because the link member 188 is connected, through the connecting shaft 190, to the supporting member 186 provided at the tip of the slide shaft 184, the link member 188 moves rearward as the slide shaft 184 moves rearward. Because the connection portion between the link member 188 and the connecting shaft 190 is positioned below the engagement pin 178 provided on the supporting wall 176, the imaginary line S connecting the center of the connecting shaft 190 and the center of the engagement pin 178 is tilted upward with respect to the vehicle 14 as the connecting shaft 190 moves rearward.

Thus, as the connection portion between the link member 188 and the connecting shaft 190 moves rearward, and the end portion of the slot 192 on the connecting shaft 190-side comes close to the engagement pin 178, the Link member 188 pivots about the engagement pin 178 so that the end portion 188A of the link member 188 on the side opposite to the connection between the link member 188 and the connecting shaft 190 ascends. Thus, the base portion 38 of the hinge upper 36 is pushed by the link member 188 from below, which urges the hinge upper 36, and therefore the hood 42, to ascend. The hinge upper 36 that is urged to ascend in this way naturally urges the tip side of the arm member 24 to ascend. Because the point at which the pushing force from the link member 188 is applied to the base portion 38 is on the side opposite to the connection portion 112 with respect to the shear pin 50, the pushing force from the link member 188 urges, through the hinge upper 36, the tip side of the arm member 24 to ascend, and urges the hinge upper 36 to pivot about the connection portion 112 so that the side of the base portion 38 on which the pushing force is applied to the base portion 38 ascends.

The turning force about the connection portion 112 has a moment directed so as to shear the shear pin 50 at the portion where the shear pin 50 is provided, which shears (breaks) the shear pin 50. When the integrative connection between the arm member 24 and the hinge upper 36 is broken in this way, as in the cases of the above embodiments, the hood 42 ascends while pivoting about the latch 86 or a point near the latch 86, that is, a front end portion of the hood 42, and the arm member 24 ascends while pivoting about the rear connecting shaft 28, until the stopper 54 is brought into contact with the base portion 38.

As described above, in the vehicle pop-up hood apparatus 170, the mechanism for applying the pushing force (lifting force) to the base portion 38 from below differs from that of the first embodiment. However, the action performed after the pushing force (lifting force) is applied to the base portion 38 is the same as that in the case of the first embodiment, and therefore, in principle, the operations and effects similar to those achieved by the first embodiment can be achieved.

However, the vehicle pop-up hood apparatus 170 differs from the above-described embodiments in that the axial direction of the actuator body 182, that is, the direction in which the slide shaft 184 slides substantially coincides with the longitudinal direction of the vehicle 14, and the linear sliding force applied in the longitudinal direction of the vehicle 14 is converted into the pushing force (lifting force), which pushes the base portion 38 from below, by the connecting shaft 190, the engagement pin 178, and the link member 188. In other words, the linear sliding force applied in the longitudinal direction of the vehicle 14 is converted into the pushing force (lifting force), which pushes the base portion 38 from below, by the conversion portion including the engagement pin 178, the link member 188, and the connecting shaft 190. Thus, it is possible to use the actuator body 182 (the actuator 180) that generates the sliding force applied in the longitudinal direction of the vehicle 14.

Consequently, even in the case of a vehicle 14 in which a space for disposing the actuator body 62 and the slide shaft 64 that has been slid upward cannot be secured, when the vehicle pop-up hood apparatus 170 is adopted, it is possible to dispose the actuator body 182 and the slide shaft 184 along the upper surface of the cowl top 18, for example. Thus, it is possible to dispose the actuator 180 at the optimal position for the vehicle 14.

In this embodiment, the actuator body 182, which is a component of the actuator 180, is, by means of a bracket or the like, integrally fixed to the cowl top 18 of the vehicle 14 or a portion of the body of the vehicle 14 other than the cowl top 18, on the upper side of the cowl top 18. However, for example, an actuator holder may be extended from the base portion 174 of the hinge base 172 or the supporting wall 176 provided on the hinge base 172, and the actuator holder may hold the actuator body 182. Specifically, the hinge base 172 may be made to function equivalently to a bracket.

When such a modified configuration is adopted, it is possible to connect the link member 188 with the supporting member 186 and the engagement pin 178 in advance before the hinge base 172 is fixed to the vehicle 14. In this case, fixation of the actuator 180 and the link member 188 to the cowl top 18 is completed by fixing the hinge base 172 to the cowl top 18. Thus, when such a configuration is adopted, it is possible to reduce the number of steps required to fix the apparatus to the vehicle 14, and to improve the accuracy in fixing the individual members to the hood 42 or the cowl top 18.

In this embodiment, the actuator body 182 is, by means of a bracket or the like, integrally fixed to the cowl top 18 of the vehicle 14, or a portion of the body of the vehicle 14 other than the cowl top 18, on the upper side of the cowl top 18. Thus, the actuator 180 is fixed to the body of the vehicle 14, and, when the internal pressure in the actuator body 182 rises, the slide shaft 184 slides toward the rear of the vehicle 14 along with the piston, which causes the end portion 188A of the link member 188 to push the base portion 38 of the hinge upper 36 upward. However, the invention is not limited to the configuration in which the actuator 180 is fixed to the body, and the configuration in which the end portion 188A of the link member 188 pushes the base portion 38 of the hinge upper 36 upward.

For example, the actuator body 182 of the actuator 180 and the supporting wall 176 from which the engagement pin 178 protrudes may be provided on the back surface of the hood 42 or the hinge upper 36. In this case, a rise in the internal pressure in the actuator body 182 causes the slide shaft 184 to slide toward the rear of the vehicle 14 with the piston, and the end portion 188A of the link member 188 pushes the cowl top 18, or a predetermined portion of the body of the vehicle 14 other than the cowl top 18 downward, which causes the hood 42 to ascend.

When such a configuration is adopted, the linear sliding force, applied in the longitudinal direction of the vehicle 14, that is generated by the actuator 180 is converted, by the conversion portion including the engagement pin 178, the link member 188, and the connecting shaft 190, into the force to push the cowl top 18 or the predetermined portion of the body of the vehicle 14 other than the cowl top 18 downward, and, due to the downward pushing force, the reaction force to the pushing force, which is applied from the cowl top 18 or the predetermined portion of the body of the vehicle 14 other than the cowl top 18 to the end portion 188A of the link member 188, acts as the lifting force to lift the hood 42. Thus, the operations and effects similar to those achieved by the above-described embodiments are achieved also when such a configuration is adopted.

When the actuator body 182 of the actuator 180 is provided on the back surface of the hood 42 or on the hinge upper 36, instead of on the cowl top 18 or a portion of the body of the vehicle 14 other than the cowl top 18, there is an advantage that it is possible to fix the actuator body 180 even when the space for disposing the actuator body 180 cannot be secured on the cowl top 18-side, that is, on the vehicle body side.

In particular, when the supporting wall 176 is provided on the hinge upper 36, and the hinge upper 36 supports the actuator body 182 (that is, the hinge upper 36 is made to function equivalently to a bracket), the link member 188 is connected with the supporting member 186 and the engagement pin 178 in advance before the hinge upper 36 is fixed to the vehicle 14. In this case, fixation of the actuator 180 and the link member 188 to the hood 42 is completed by fixing the hinge upper 36 to the hood 42. Thus, it is possible to reduce the number of steps required to fix the apparatus to the vehicle 14, and to improve the accuracy in fixing the individual members to the hood 42 or the cowl top 18.

Next, a seventh embodiment of the invention will be described.

Figure 16:
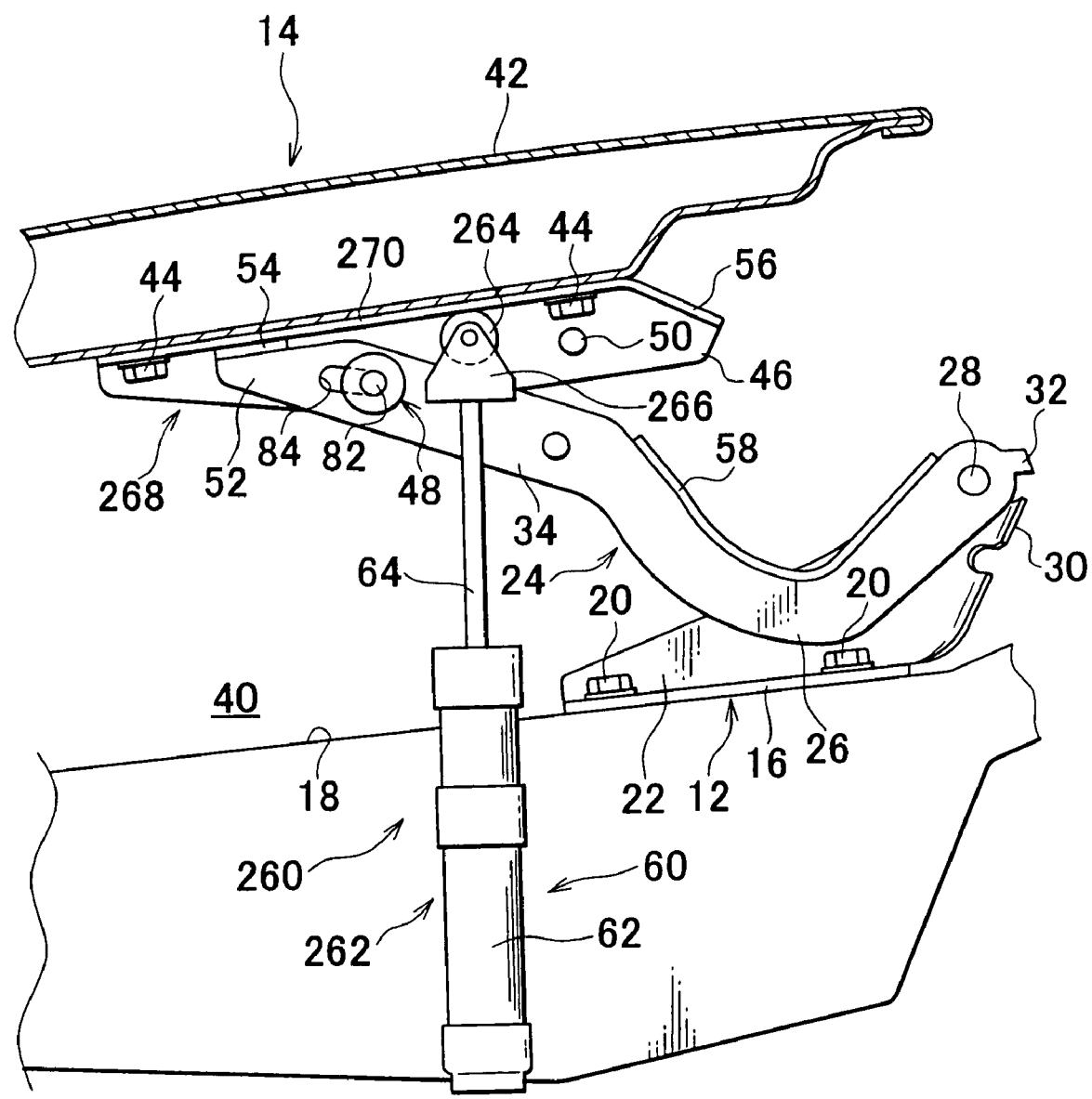
FIG. 16 is a side view showing a state in which a vehicle pop-up hood apparatus according to a seventh embodiment of the invention is activated.

FIG. 16 shows, in side view, a configuration of a main portion of a vehicle pop-up hood apparatus 260 according to the seventh embodiment. As shown in FIG. 16, the vehicle pop-up hood apparatus 260 is not provided with the actuator 60, but provided with an actuator 262 instead. The actuator 262 is provided with a roller 264 as the rolling element. The roller 264 is installed on a bracket 266 provided at the tip of the slide shaft 64 so as to be rotatable about the axis that extends in the lateral direction of the vehicle 14.

The vehicle pop-up hood system 260 is not provided with the hinge upper 36, but provided with a hinge upper 268 instead. The configuration of the hinge upper 268 is basically the same as that of the hinge upper 36, except that a base portion 270 that replaces the base portion 38 is a component of the rolling element contact portion. The outer surface of the roller 264 abuts the lower surface of the base portion 270 at a point between the connection portion 48 and the shear pin 50, and the roller 264 rolls on the base portion 270 in the longitudinal direction of the vehicle 14 owing to the friction between the roller 264 and lower surface of the base portion 270.

In the vehicle pop-up hood apparatus 260 characterized by the above-described configuration, when the actuator 262 is activated, the pushing force from the roller 264 is applied to the base portion 270 of the hinge upper 268, the hood 42 thus pivots upward about a point at which the hood 42 is coupled to the body of the vehicle 14 by means of the latch 86 or the neighboring point, and the hinge upper 268 also pivots along with the hood 42. This pivotal movement causes the base portion 270 (hinge upper 268) to move toward the front of the vehicle 14 while ascending. Although this causes the point at which the roller 264 and the base portion 270 are in contact with each other to shift, the roller 264 rolls along the base portion 270 with the outer surface of the roller 264 in contact with the base portion 270, and therefore, the roller 264 and the base portion 270 do not receive a large resistance when the contact point between the roller 264 and the base portion 270 shifts. Because the contact point between the roller 264 and the base portion 270 shifts in this way, the latch 86 is more effectively prevented from being unnecessarily deformed as the hood 42 ascends, and therefore, the hood 42 is surely lifted.

The configuration of the vehicle pop-up hood system 260 is basically the same as that of the vehicle pop-up hood system 10 according to the first embodiment, except that, instead of the pushing portion 66, the roller 264 is provided at the tip of the slide shaft 64. Thus, in principle, the operations and effects similar to those achieved by the first embodiment can be achieved also by this embodiment.

Next, an eighth embodiment of the invention will be described.

Figure 17:
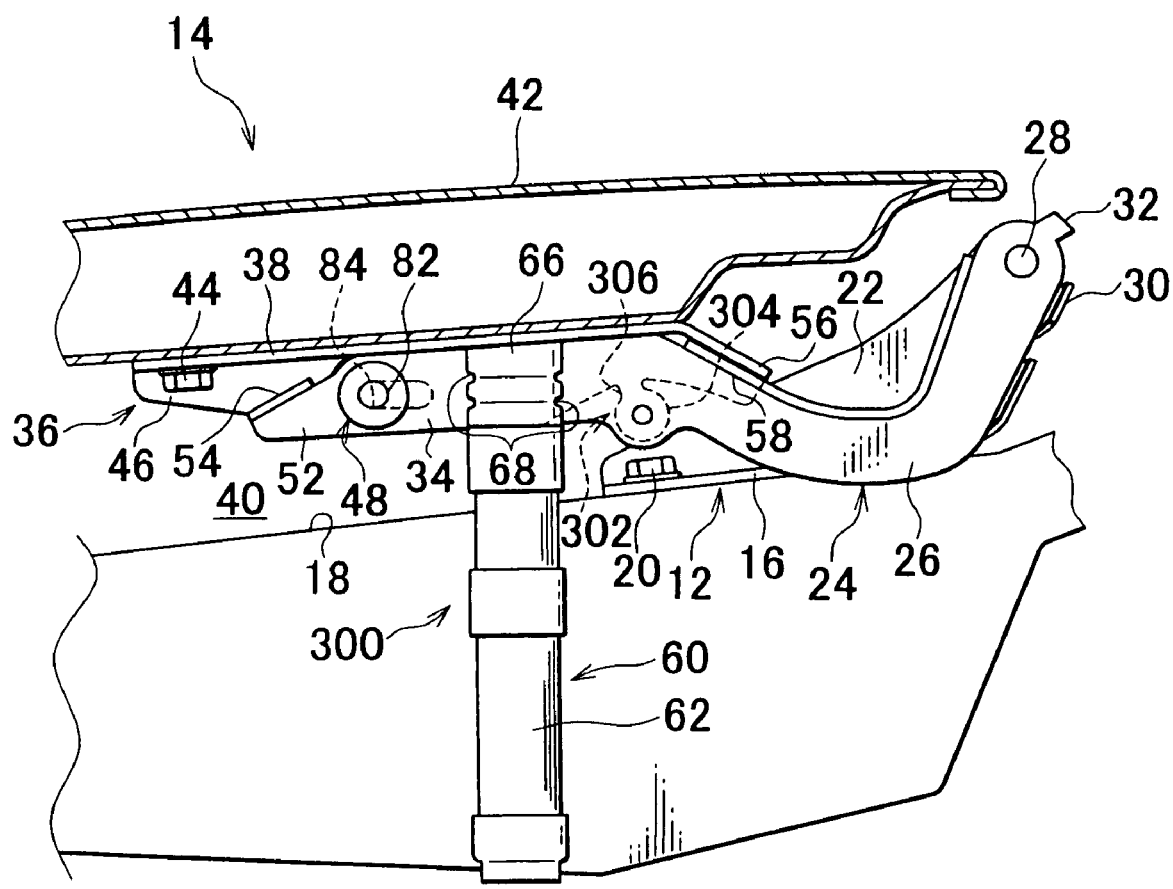
FIG. 17 is a side view showing a configuration of a main portion of a vehicle in which a vehicle pop-up hood apparatus according to an eighth embodiment of the invention is used.
Figure 18:
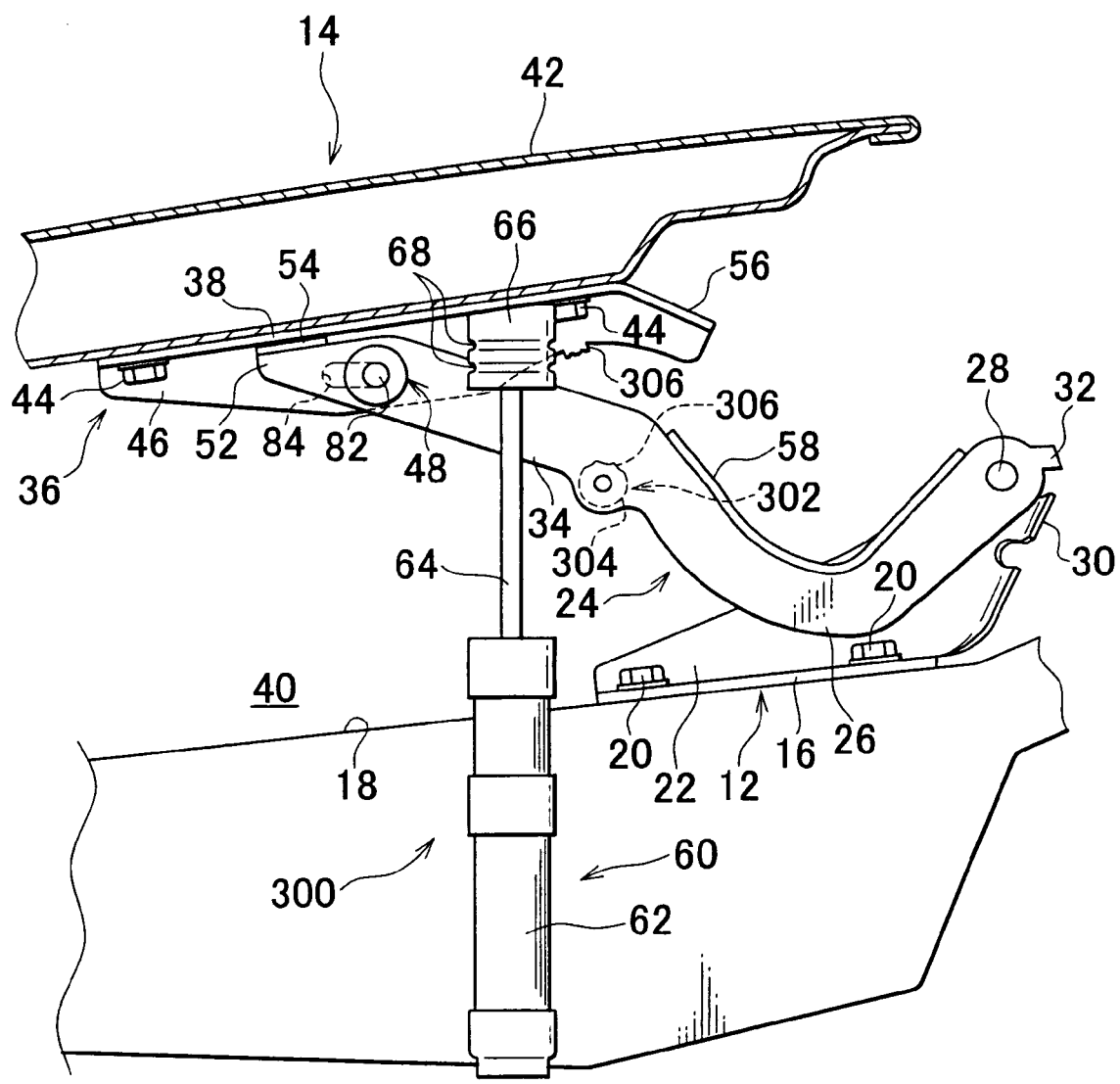
FIG. 18 is a side view corresponding to FIG. 17, showing a state in which the vehicle pop-up hood apparatus according to the eighth embodiment of the invention is activated.

FIG. 17 shows, in side view, a configuration of a vehicle pop-up hood apparatus 300 according to the eighth embodiment FIG. 18 shows a side view corresponding to FIG. 17, in which the vehicle pop-up hood apparatus 300 is activated.

As shown in FIGS. 17 and 18, the vehicle pop-up hood apparatus 300 is not provided with the shear pin 50, which serves as the deformation portion of the second connection section, but provided with a tension plate 302 instead, which serves as the second connection section (connection mechanism). The tension plate 302 includes a plate body 304. The plate body 304 has a shape of a plate of which the thickness direction substantially coincides with the lateral direction of the vehicle 14. The plate body 304 faces the connection leaf 34 of the arm member 24 in the lateral direction of the vehicle 14 on the side, with respect to the shaft 82, that is closer to the rear of the vehicle 14. The plate body 304 is integrally connected to the connection leaf 34 by means of fastening parts, such as bolts, or by welding, for example. A weak portion 306, which serves as the deformation portion, is provided on the upper side of the plate body 304, continuously extending from the plate body 304.

As in the case of the plate body 304, the weak portion 306 has a shape of a plate of which the thickness direction substantially coincides with the lateral direction of the vehicle 14. However, the width of the weak portion 306 is sufficiently narrower than that of the plate body 304, and the mechanical strength of the weak portion 306 is sufficiently lower than that of the plate body 304. The weak portion 306 is connected to the connection leaf 46 of the hinge upper 36 on the side opposite to the plate body 304. Specifically, in this embodiment, the tension plate 302 extends from the connection leaf 46, that is, the tension plate 302 is formed as part of the hinge upper 36 in terms of mechanical parts.

In the vehicle pop-up hood apparatus 300 characterized by the above-described configuration, as in the case of the first embodiment, when the pressure of the gas that is generated in the actuator body 62 when the gas generating propellant is burned causes the piston to ascend, and the pushing portion 66 pushes the base portion 38 of the hinge upper 36 upward, the hinge upper 36 is urged to pivot relative to the arm member 24 about the shaft 82 of the connection portion 48 so that the side of the base portion 38, with respect to the connection portion 48, on which the pushing force from the pushing portion 66 is applied, ascends. Such pivotal movement of the hinge upper 36 relative to the arm member 24 urges the connection leaf 46 of the hinge upper 36 to ascend so as to move away from the plate body 304 of the tension plate 302.

Thus, as shown in FIG. 18, the weak portion 306 of which the mechanical strength is sufficiently lower than the plate body 304 is broken, and the mechanical and integrative connection between the arm member 24 and the hinge upper 36 by means of the tension plate 302 is broken. When the connection between the arm member 24 and the hinge upper 36 is broken in this way, the hinge upper 36 becomes pivotable relative to the arm member 24 about the shaft 82 of the connection portion 48. The pushing force from the pushing portion 66 father applied in this situation causes the hinge upper 36, and therefore the hood 42, to ascend while pivoting about the latch 86 or a point near the latch 86, that is, a front end portion of the hood 42.

As described above, the vehicle pop-up hood system 300 is provided with the tension plate 302 instead of the shear pin 50. However, the shear pin 50 and the tension plate 302 are equivalent in that they are broken due to the pivotal movement of the hinge upper 36 relative to the arm member 24 that is caused when the pushing force is applied from the pushing portion 66, whereby the mechanical and integrative connection between the arm member 24 and the hinge upper 36 is broken. Thus, in principle, the operations and effects similar to those achieved by the first embodiment are achieved also by the vehicle pop-up hood apparatus 300 that is provided with the tension plate instead of the shear pin 50.

As described above, the configuration of this embodiment is basically the same as that of the first embodiment, except that the shear pin 50 is replaced by the tension plate 302. However, needless to say, it is also possible to use the tension plate 302 instead of the shear pin 50 in another embodiment than the first embodiment.

Although, in this embodiment, the tension plate 302 is formed as part of the hinge upper 36, and the plate body 304 is connected to the connection leaf 34, the tension plate 302 may be formed as part of the connection leaf 34, and the plate body 304 may be connected to the connection leaf 46 of the hinge upper 36.

In addition, although the mechanical strength of the weak portion 306 is set low by setting the width of the weak portion 306 narrower than that of the plate body 304, it suffices that the mechanical strength of the weak portion 306 is lower than that of the plate body 304, and the weak portion 306 is therefore broken when the hinge upper 36 pivots relative to the arm member 24. There is no need to set the width of the weak portion 306 narrower than that of the plate body 304 as described above. The mechanical strength of the weak portion 306 may be set lower than that of the plate body 304 by forming at least one hole in the weak portion 306. Alternatively, the mechanical strength of the weak portion 306 may be set lower than that of the plate body 304 materially by subjecting the weak portion 306 to a heat treatment, a chemical treatment, or the like.

In the above embodiments, the shear pin 50 and the tension plate 302 are broken when the hinge upper 36 pivots relative to the arm member 24. However, the deformation portion of the second connection section is not limited to such a form, that is, a portion that is broken to break the mechanical and integrative connection between the arm member 24 and the hinge upper 36. The deformation portion may be plastically deformed instead of broken to break the mechanical and integrative connection between the arm member 24 and the hinge upper 36.

For example, a hole open toward the connection leaf 46 may be formed in the connection leaf 34, a protrusion that can be fitted into the hole formed in the connection leaf 34 may be formed on the connection leaf 46, and the protrusion may serve as the deformation portion of the second connection section. When such a configuration is adopted, the pivotal movement of the hinge upper 36 relative to the arm member 24 about the connection portion 48 is prevented by the fit of the protrusion on the connection leaf 46 into the hole in the connection leaf 34 in principle.

When the pushing force from the pushing portion 66 urges the hinge upper 36 to pivot relative to the arm member 24, for example, the protrusion on the connection leaf 46 is plastically deformed by the inner wall of the hole in the connection leaf 34, and the protrusion on the connection-leaf 46 comes out of the hole in the connection leaf 34. The mechanical and integrative connection between the arm member 24 and the hinge upper 36 by means of the protrusion on the connection leaf 46 is thus broken. In principle, the operations and effects similar to those achieved by the embodiments described above are achieved also when such a configuration is adopted.

Next, a ninth embodiment of the invention will be described.

Figure 19:
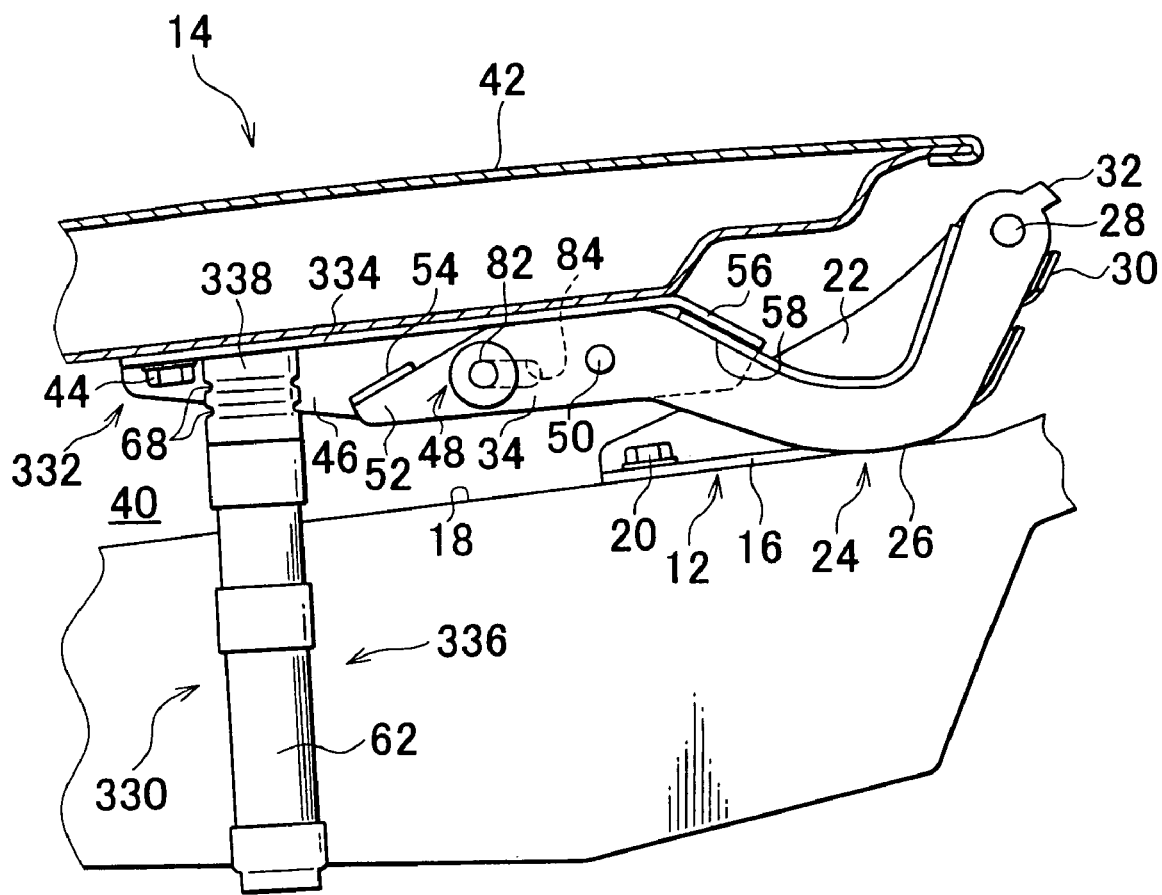
FIG. 19 is a side view showing a configuration of a main portion of a vehicle in which a vehicle pop-up hood apparatus according to a ninth embodiment of the invention is used.
Figure 20:
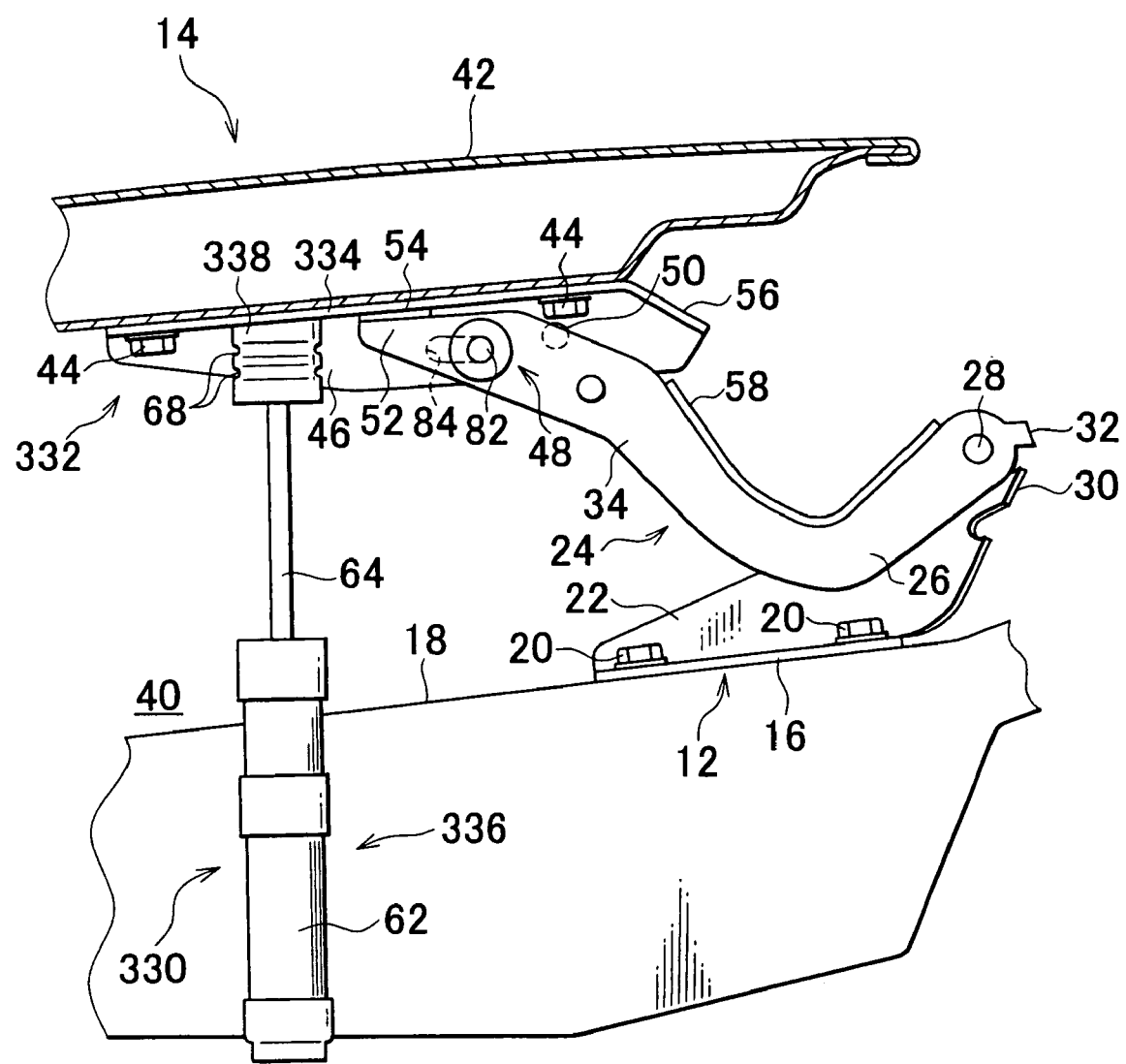
FIG. 20 is a side view corresponding to FIG. 19, showing a state in which the vehicle pop-up hood apparatus according to the ninth embodiment of the invention is activated.

FIG. 19 shows, in side view, a configuration of a vehicle pop-up hood apparatus 330 according to the ninth embodiment. FIG. 20 shows a side view corresponding to FIG. 19, in which the vehicle pop-up hood apparatus 330 is activated.

As shown in these figures, the vehicle pop-up hood apparatus 330 is not provided with the hinge upper 36, but provided with a hinge upper 332 instead. The hinge upper 332 is provided with a base portion 334. The configuration of the base portion 334 is basically the same as that of the base portion 38 of the hinge upper 36 of the first embodiment in, for example, that the base portion 334 has a shape of a plate of which the thickness direction substantially coincides with the vertical direction of the vehicle 14, and that the base portion 334 is integrally fixed to the hood 42 on the back side of the hood 42 with fastening parts, such as the bolts 44. However, the length of the base portion 334 of the hinge upper 332 in the longitudinal direction of the vehicle 14 is sufficiently longer than that of the base portion 38 of the hinge upper 36. The tip (front end) of the base portion 334 is located further forward than the base portion 38 of the hinge upper 36 with respect to the vehicle 14.

The hinge upper 332 is provided with an actuator 336. The configuration of the actuator 336 is basically the same as that of the actuator 60 of the first embodiment. When a piston slides toward the upper end of the actuator body 62 as the internal pressure in the actuator body 62 rises, the slide shaft 64 integrally connected to the piston slides upward. It should be noted that the actuator 336 is disposed further forward than the actuator 60 with respect to the vehicle 14. A pushing portion 338, which replaces the pushing portion 66, is provided at the tip (upper end) of the slide shaft 64 of the actuator 336. The configuration of the pushing portion 338 is basically the same as that of the pushing portion 66, except that the pushing portion 338 is in contact with the base portion 334 on the side, with respect to the connection portion 48, that is closer to the front of the vehicle 14, that is, on the side opposite to the shear pin 50 with respect to the connection portion 48.

In the first embodiment, the pushing portion 66 is in contact with the base portion 38 of the hinge upper 36 at a point between the connection portion 48 and the shear pin 50, and, when the actuator 60 is activated, the pushing portion 66 pushes the base portion 38 at the point between the connection portion 48 and the shear pin 50, and causes the hood 42 to ascend through the hinge upper 36. In this embodiment, however, the pushing portion 338 is in contact with the base portion 334 of the hinge upper 332 on the side opposite to the shear pin 50 with respect to the connection portion 48, and, when the actuator 60 is activated, the pushing portion 338 pushes the base portion 334 on the side opposite to the shear pin 50 with respect to the connection portion 48.

Figure 21:
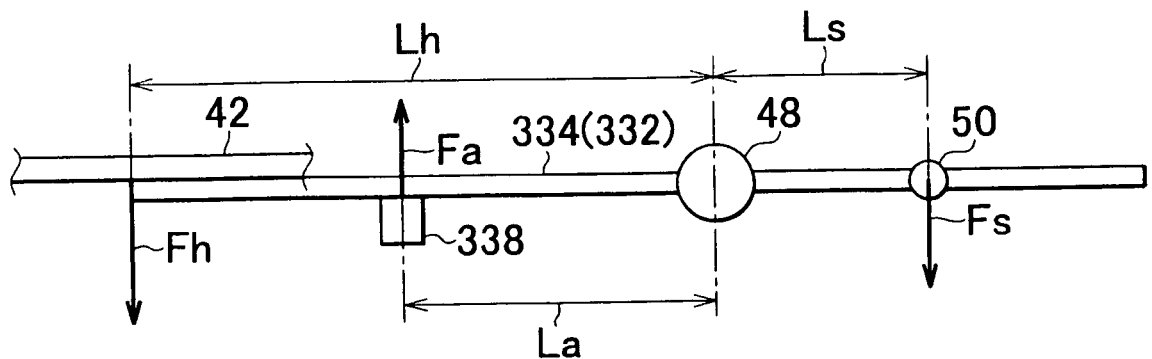
FIG. 21 is a side view schematically showing a main portion of the vehicle pop-up hood apparatus according to the ninth embodiment of the invention.

As shown in the schematic diagram of FIG. 21, when the distance from the connection portion 48 to the point at which the pushing portion 338 is in contact with the base portion 334 (that is, the point on the base portion 334 at which the pushing portion 338 pushes the base portion 334) is La, the distance from the connection portion 48 to the tip (front end) of the base portion 334 is Lh, the distance from the connection portion 48 to the shear pin 50 is Ls, the pushing force (lifting force) that the pushing portion 338 applies to the base portion 334 when the actuator 336 is activated is Fa, the bending strength of the hood 42 at the tip (front end) of the base portion 334 (the bending strength of the hood 42 measured when the tip of the base portion 334 is the fulcrum) is Fh, and the force required to break (shear) the shear pin 50 is Fs, the values of La, Lh, Ls, Fa, Fh, and Fs are set so as to satisfy the relation expressed by the following Expression 1.

$$Fh \cdot Lh > Fa \cdot La + Fs \cdot Ls \qquad \text{(Expression 1)}$$

When the actuator 336 is activated when the vehicle pop-up hood system 330 is in the initial condition (normal condition) as shown in FIG. 19, and the pushing portion 338 thus ascends, the pushing force Fa shown in FIG. 21 is applied to the hood 42 through the base portion 334 by the pushing portion 338, which causes the hood 42 and the hinge upper 332 to ascend in a manner such that the hood 42 and the hinge upper 332 pivot about the latch 86 (see FIG. 5) or a point near the latch 86, that is, a front end portion of the hood 42. The connection leaf 46 of the hinge upper 332 is connected to the connection leaf 34 of the arm member 24 through the shear pin 50 and the shaft 82 of the connection leaf 46. Thus, the hinge upper 332 is urged to ascend with the arm member 24. However, the rear end of the arm member 24 is connected to the supporting portion 22 of the hinge base 12 through the connecting shaft 28, the tip (front end) of the arm member 24 ascends in a manner such that the arm member 24 pivots about the connecting shaft 28 (see FIG. 20).

Thus, the hinge upper 332 ascends in a manner such that the hinge upper 332 pivots about the latch 86 or a point near the latch 86, and the arm member 24 ascends in a manner such that the arm member 24 pivots about the connecting shaft 28 in the direction opposite to the direction of the pivotal movement of the hinge upper 332. Thus, the arm member 24 and the hinge upper 332 pivot relative to each other about the shaft 82 of the connection portion 48. The relative pivotal movement about the shaft 82 of the connection portion 48 produces a moment directed so as to shear the shear pin 50 at the portion where the shear pin 50 is provided. When a force greater than the shear strength Fs shown in FIG. 21 is exerted on the shear pin 50, the shear pin 50 is sheared (broken). Thus, the integrative connection between the arm member 24 and the hinge upper 332 is broken.

When the integrative connection between the arm member 24 and the hinge upper 332 is broken in this way, the pushing force from the pushing portion 338 causes 15 the hood 42 and the hinge upper 332 to ascend in a manner such that the hood 42 and the hinge upper 332 pivot about the latch 86 or a point near the latch 86. In addition, the arm member 24, of which the tip (front end) side is drawn upward by the hinge upper 36 that is ascending, pivots about the rear connecting shaft 28 in a manner such that the arm member 24 ascends.

As shown in FIGS. 19 to 21, the point at which the pushing force Fa from the pushing portion 338 is applied is on the side opposite the shear pin 50 with respect to the connection portion 48. Thus, when the pushing force Fa urges the hinge upper 332 to pivot relative to the arm member 24 about the shaft 82 of the connection portion 48, the direction of the pivotal movement is opposite to the direction of the pivotal movement of the hinge upper 36 relative to the arm member 24 in the first embodiment. However, because the contact leaf 56 is in contact with the supporting leaf 58, such pivotal movement is prevented. Thus, the pushing force Fa does not directly acts on the shear pin 50 so as to shear the shear pin 50.

However, in this embodiment, the distance La from the connection portion 48 to the point at which the pushing portion 338 is in contact with the base portion 334 (that is, the point on the base portion 334 at which the pushing portion 338 pushes the base portion 334), the distance Lh from the connection portion 48 to the tip (front end) of the base portion 334, the distance Ls from the connection portion 48 to the shear pin 50, the pushing force (lifting force) Fa that the pushing portion 338 applies to the base portion 334 when the actuator 336 is activated, and the bending strength Fh of the hood 42 at the tip (front end) of the base portion 334 (the bending strength of the hood 42 measured when the tip of the base portion 334 is the fulcrum) are set so as to satisfy the relation expressed by the above Expression 1. Consequently, before the pushing force Fa bends the hood 42 with the fulcrum at the tip of the base portion 334, the shear pin 50 is sheared. Accordingly, in this embodiment, the operations achieved when the point at which the pushing force Fa from the pushing portion 338 is applied is set at a point between the connection portion 48 and the shear pin 50 as in the case of the first embodiment cannot be achieved. However, as a result, it is possible to make it unnecessary to excessively reinforce the hood 42, for example.

The configuration of this embodiment is basically the same as that of the first embodiment, except that the point at which the pushing force Fa from the pushing portion 338 is applied is set on the side opposite to the shear pin 50 with respect to the connection portion 48. Thus, in principle, the operations and effects similar to those achieved by the first embodiment can be achieved, except the operations achieved when the point at which the pushing force Fa from the pushing portion 338 is applied is set at a point between the connection portion 48 and the shear pin 50.

Figure 22:
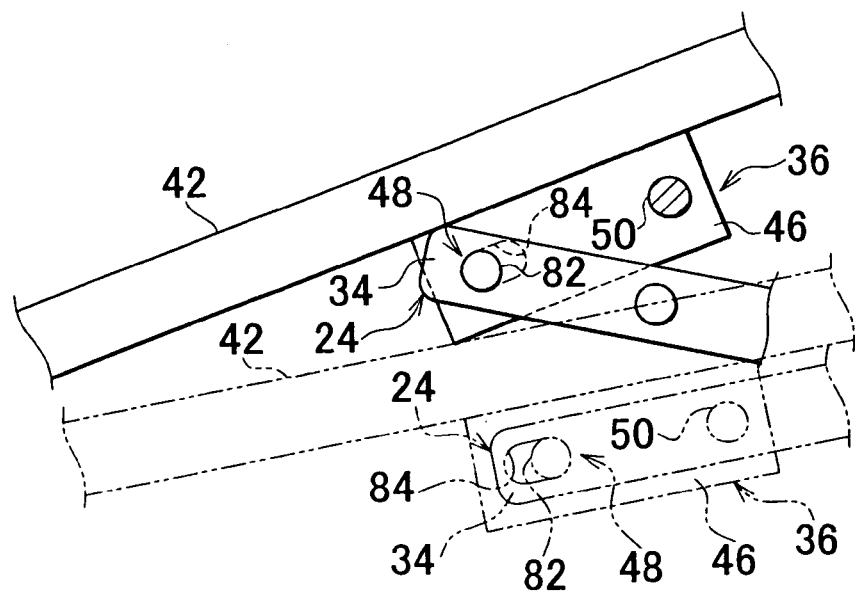
FIG. 22 is a schematic view showing an example in which the direction in which a shaft shifts in a slot is inverse.

In the above embodiments, when the hood 42 ascends while pivoting about the latch 86 or a point near the latch 86, one of the shaft 82 and the slot 84 that is provided on or in the connection leaf 46 shifts toward the front of the vehicle 14 relative to the other that is provided on or in the connection leaf 34. However, depending, for example, on the relative positions between, for example, the connecting shaft 28, the center of the pivotal movement of the hood 42, and the shaft 82 in the initial condition (normal condition), and on the angle and the trajectory of the pivotal movement of the hood 42 and the arm member 24 that is performed when the hood 42 ascends, one of the shaft 82 and the slot 84 that is provided on or in the connection leaf 34 may shift toward the rear of the vehicle 14 relative to the other that is provided on or in the connection leaf 46 (see the schematic diagram shown in FIG. 22, for example) or reciprocate in the longitudinal direction when the hood 42 ascends while pivoting about the latch 86 or a point near the latch 86. In this case, the shaft 82 in the slot 84 in the initial condition that is described in connection with the above embodiments may be positioned on the opposite side in the slot 84, or may be positioned in the longitudinal middle of the slot 84.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. A vehicle pop-up hood apparatus comprising:
   an arm member, of which a proximal end portion is connected to a body of a vehicle via a bracket so as to be pivotable about a first axis extending in a width direction of the vehicle;
   a connection mechanism by which a hood of the vehicle is integrally connected to a tip side portion of the arm member, and that allows the hood to pivot relative to the arm member about a second axis extending in the width direction of the vehicle, and to move relative to the arm member in a longitudinal direction of the vehicle when an integrative connection between the arm member and the hood is broken;
   an actuator that breaks the integrative connection, established by means of the connection mechanism, between the hood and the arm member, and that generates a lifting force that lifts the hood relative to the body, the connection mechanism includes a deformation portion by which the arm member and the hood are integrally connected with each other, and that breaks the integrative connection between the arm member and the hood by being plastically deformed by the lifting force generated by the actuator;
   a first restriction mechanism that restricts an angle of pivotal movement of the arm member relative to the body to a predetermined angle at a connection portion at which the proximal end portion of the arm member and the body are connected, the first restriction mechanism including a contact tab and a stopper;
   a second restriction mechanism that, when the hood is lifted by the lifting force, stops an ascent of the hood so that the stopper of the first restriction mechanism does not contact the contact tab; and
   a third restriction mechanism having a first portion formed on the arm member and a second portion connected to the hood,
   wherein the contact tab of the first restriction mechanism is formed at the proximal end portion of the arm member, the stopper of the first restriction mechanism is formed at a proximal end portion of the bracket, the first axis being a pivotal axis extending through both the arm member with the contact tab and the bracket with the stopper, and the second restriction mechanism is formed at a distal end portion of the arm member such that the contact tab is in proximity to the stopper of the first restriction mechanism.

2. The pop-up hood apparatus according to claim 1, wherein the connection mechanism includes:
   a slot, of which a longitudinal axis extends in the longitudinal direction of the vehicle, the slot being formed in one of the hood and the arm member; and
   a connection member that is provided on the other of the hood and the arm member, and is inserted in the slot so that the connection member is movable in the slot in a longitudinal direction of the slot and is rotatable relative to the one of the hood and the arm member about the second axis extending in the width direction of the vehicle.

3. The pop-up hood apparatus according to claim 2, wherein:
   when the actuator breaks the connection, established by means of the connection mechanism, between the arm member and the hood, and lifting of the hood caused by the lifting force generated by the actuator is completed, the slot is positioned on an imaginary straight line, and the longitudinal axis of the slot and the imaginary straight line substantially coincides with each other, the imaginary straight line connecting a first center of pivotal movement of the arm member relative to the body and a second center, of the connection mechanism, of pivotal movement of the arm member relative to the hood; and
   a length of the slot in the longitudinal direction of the slot is set equal to or greater than a sum of a diameter of the connection member and an amount of displacement between a position that the second center would take when an upward pivotal movement of the arm member relative to the body about the first center were completed with the integrative connection between the hood and the arm member by means of the connection mechanism maintained, and a position that the second center takes when the ascent of the hood caused by the lifting force generated by the actuator is completed.

4. The pop-up hood apparatus according to claim 1, wherein the actuator is fixed to the hood and applies the lifting force to at least one of the body and the arm member.

5. The pop-up hood apparatus according to claim 1, wherein
   the arm member is connected to the bracket, and
   the actuator is fixed to a second bracket.

6. The pop-up hood apparatus according to claim 1, wherein
   the actuator includes:
   an actuator body that is provided on one of the body and the hood; and
   a slide member, provided so as to be linearly slidable relative to the actuator body, that slides in a direction such that a distal end of the slide member moves away from the actuator body to generate the lifting force.

7. The pop-up hood apparatus according to claim 6, wherein
   the actuator body is provided on the one of the body and the hood so as to be swingable about a third axis extending in the width direction of the vehicle.

8. The pop-up hood apparatus according to claim 6, wherein:
   the slide member applies the lifting force to the hood by directly applying a pushing force to one of the body, the hood, and the arm member through the distal end of the slide member, and
   the distal end of the slide member, and the one of the body, the hood, and the arm member are connected to each other so as to be swingable relative to each other about a fourth axis extending in the width direction of the vehicle.

9. The pop-up hood apparatus according to claim 6, wherein
the actuator is disposed so that, when the hood is closed, the distal end of the slide member with respect to a slide direction of the slide member is brought into contact with the other of the body and the hood.

10. The pop-up hood apparatus according to claim 6, further comprising:
a pushing force application portion to which a pushing force that is generated when the slide member slides is directly applied; and
a rolling element, provided on one of the distal end of the slide member and the pushing force application portion, that is rotatable about a fifth axis extending in the width direction of the vehicle, wherein
an outer surface of the rolling element rollably abuts the other of the distal end of the slide member and the pushing force application portion.

11. The pop-up hood apparatus according to claim 6, wherein
the slide member slides in a predetermined direction that crosses the vertical direction of the vehicle, and
the pop-up hood apparatus further comprises a conversion portion that changes a direction of the pushing force in the predetermined direction that is generated when the slide member slides, to convert the pushing force to the lifting force.

12. The pop-up hood apparatus according to claim 6, further comprising:
a force receiving portion to which the pushing force generated when the slide member slides is directly applied, wherein
at least one of the force receiving portion and the distal end of the slide member has a curved surface.

13. The pop-up hood apparatus according to claim 12, wherein: at least one of the force receiving portion and the distal end of the slide member has a convex curved surface that is curved so as to be convex toward the other of the force receiving portion and the distal end of the slide member; and the other of the force receiving portion and the distal end of the slide member has a concave curved surface that has a curvature radius greater than a curvature radius of the convex curved surface.

14. The pop-up hood apparatus according to claim 12, wherein the force receiving portion is a cylindrical shaft member fixed to the arm member, and the distal end of the slide member has a concave curved surface that has a curvature radius greater than a radius of an outer surface of the shaft member.

15. The pop-up hood apparatus according to claim 1, wherein
the second restriction mechanism includes a contact portion that is integrally formed with the arm member, and that, when the hood is pivoted relative to the arm member about the second axis by the lifting force, is brought into planar contact with the hood to stop the pivotal movement of the hood relative to the arm member, and to stop the ascent of the hood.

16. The pop-up hood apparatus according to claim 1, wherein
the stopper is provided on the body at or near the connection portion between the proximal end portion of the arm member and the body; and
the contact tab is integrally formed with the arm member, and that, when the arm member pivots relative to the body as the hood pivots in a direction such that the hood is opened, comes close to the stopper, and is brought into contact with the stopper, to stop the pivotal movement of the arm member relative to the body.

17. The pop-up hood apparatus according to claim 1, wherein the actuator is fixed to the body.

18. A vehicle pop-up hood apparatus comprising:
an arm member, of which a proximal end portion is connected to a body of a vehicle via a bracket so as to be pivotable about a first axis extending in a width direction of the vehicle;
a connection mechanism by which a hood of the vehicle is integrally connected to a tie portion of the arm member, and that allows the hood to pivot relative to the arm member about a second axis extending in the width direction of the vehicle, and to move relative to the arm member in a longitudinal direction of the vehicle when an integrative connection between the arm member and the hood is broken;
an actuator that breaks the integrative connection, established by means of the connection mechanism, between the hood and the arm member, and that generates a lifting force that lifts the hood relative to the body:
a first restriction mechanism that restricts an angle of pivotal movement of the arm member relative to the body to a predetermined angle at a connection portion at which the proximal end portion of the arm member and the body are connected, the first restriction mechanism including a contact tab and a stopper;
a second restriction mechanism that, when the hood is lifted by the lifting force, stops an ascent of the hood so that the stopper of the first restriction mechanism does not contact the contact tab; and
a third restriction mechanism having a first portion formed on the arm member and a second portion connected to the hood, wherein
the contact tab of the first restriction mechanism is formed at the proximal end portion of the arm member,
the stopper of the first restriction mechanism is formed at a proximal end portion of the bracket,
the first axis being a pivotal axis extending through both the arm member with the contact tab and the bracket with the stopper,
the second restriction mechanism is fainted at a distal end portion of the arm member such that the contact tab is in proximity to the stopper of the first restriction mechanism, and
the third restriction mechanism restricts pivotal movement in a direction opposite to the direction of the pivotal movement, caused by the lifting force, of the arm member relative to the hood about the second axis.

* * * * *